US012738644B2

(12) United States Patent
Ding et al.

(10) Patent No.: US 12,738,644 B2
(45) Date of Patent: Sep. 15, 2026

(54) ANTENNA AND ANTENNA SYSTEM

(71) Applicants: Beijing BOE Sensor Technology Co., Ltd., Beijing (CN); BOE TECHNOLOGY GROUP CO., LTD., Beijing (CN)

(72) Inventors: Yi Ding, Beijing (CN); Haocheng Jia, Beijing (CN); Feng Qu, Beijing (CN); Chuncheng Che, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 616 days.

(21) Appl. No.: 18/019,562

(22) PCT Filed: Jan. 21, 2022

(86) PCT No.: PCT/CN2022/073122

§ 371 (c)(1),
(2) Date: Feb. 3, 2023

(87) PCT Pub. No.: WO2023/137690

PCT Pub. Date: Jul. 27, 2023

(65) Prior Publication Data

US 2024/0258705 A1 Aug. 1, 2024

(51) Int. Cl.
*H01Q 3/36* (2006.01)

(52) U.S. Cl.
CPC .................................... *H01Q 3/36* (2013.01)

(58) Field of Classification Search
CPC .......... H01Q 3/36; H01Q 3/44; H01Q 21/065; H01Q 21/08; H01P 1/184
See application file for complete search history.

(56) References Cited

U.S. PATENT DOCUMENTS 8,063,832 B1 * 11/2011 Weller .................. H01Q 21/08 343/824
11,145,978 B2 * 10/2021 Zimmerman .......... H01P 1/184
(Continued)

FOREIGN PATENT DOCUMENTS

CN 1638190 A 7/2005
CN 101578737 A 11/2009
(Continued)

OTHER PUBLICATIONS

Ma, Lei-Qiang, "Liquid Crystal Based Ku Band Electronic Tunable Phase Shifter," Master's Thesis, Feb. 2016, pp. 30-41, Harbin Institute Of Technology, Heilongjiang province, China.
(Continued)

*Primary Examiner* — Alexander H Taningco
(74) *Attorney, Agent, or Firm* — HOUTTEMAN LAW LLC

(57) ABSTRACT

Provided are an antenna and an antenna system. The antenna includes: a feeding network and antenna units electrically connected with the feeding network. The feeding network includes n stages, each stage includes $2^{n-1}$ transmission components; when n=1, first and second transmission lines of each transmission component are electrically connected with different antenna units; when n>1, the first and second transmission lines of the transmission component in the $n^{th}$ stage are respectively connected with two antenna units, the antenna units connected with first and second transmission lines are different; the first and second transmission lines of the transmission component in an $i^{th}$ stage are electrically connected with two different main path portions in an $(i+1)^{th}$ stage, main path portions connected with the first and second transmission lines are different; $1 \le i < n$. At least part of the transmission components each further include a phase shift unit.

20 Claims, 10 Drawing Sheets

(56) References Cited

U.S. PATENT DOCUMENTS

| | | | | |
|---|---|---|---|---|
| 2009/0262037 | A1* | 10/2009 | Matyas | H01Q 19/17 343/779 |
| 2011/0248796 | A1* | 10/2011 | Pozgay | H01Q 25/02 333/137 |
| 2014/0302807 | A1 | 10/2014 | Lee et al. | |
| 2019/0128999 | A1* | 5/2019 | Horst | G01S 7/032 |
| 2019/0165480 | A1* | 5/2019 | Daniel | H01Q 13/20 |
| 2020/0411984 | A1* | 12/2020 | Fitzgerald | H01Q 1/246 |
| 2021/0021032 | A1* | 1/2021 | Gómez-Diaz | H01Q 9/045 |
| 2021/0066813 | A1* | 3/2021 | Salman | H01Q 5/371 |
| 2021/0167518 | A1* | 6/2021 | Achour | H01Q 21/005 |
| 2023/0138258 | A1* | 5/2023 | Lei | H01Q 3/36 343/853 |
| 2023/0361466 | A1* | 11/2023 | Tang | H01Q 3/36 |
| 2024/0405428 | A1* | 12/2024 | Humphrey | H01Q 21/065 |

FOREIGN PATENT DOCUMENTS

| | | | |
|---|---|---|---|
| CN | 103326115 | B | 1/2016 |
| CN | 106469843 | A | 3/2017 |
| CN | 207074711 | U | 3/2018 |
| CN | 109193081 | A | 1/2019 |
| CN | 109314291 | A | 2/2019 |
| CN | 111668603 | A | 9/2020 |
| CN | 111740200 | A | 10/2020 |
| CN | 112397893 | A | 2/2021 |
| CN | 112768851 | A | 5/2021 |
| CN | 113540767 | A | 10/2021 |
| EP | 3609018 | A1 | 2/2020 |
| WO | WO2021189238 | A1 | 9/2021 |

OTHER PUBLICATIONS

Karabey et al., "A 2-D Electronically Steered Phased-Array Antenna With 2×2 Elements in LC Display Technology," IEEE Transactions on Microwave Theory and Techniques, May 2012, pp. 1297-1306, vol. 60, No. 5.

China Patent Office, First Office Action, Aug. 29, 2025, for corresponding CN application No. 202280000051.7.

* cited by examiner

ANTENNA AND ANTENNA SYSTEM

TECHNICAL FIELD

The present disclosure relates to the field of communication technology, and particularly relates to an antenna and an antenna system.

BACKGROUND

In the field of communication technology, a conventional large-scale antenna or a phased array antenna usually adopts a form of antenna sub-arrays in consideration of cost, volume, power consumption and other aspects, that is, each phase shifter controls two or even more antenna units to form an antenna sub-array, and then a final array antenna is formed by combining different numbers of sub-arrays. In an architecture shown in FIG. 1, a antenna unit, a phase shift unit and a feeding network are independent from each other.

SUMMARY

The present disclosure is directed to solve at least one technical problem in the related art, and provides an antenna and an antenna system.

In a first aspect, an embodiment of the present disclosure provides an antenna, which includes: a feeding network and a plurality of antenna units electrically connected with the feeding network; the feeding network includes n stages of transmission components, and each stage includes $2^{n-1}$ transmission components, n is greater than or equal to 1 and is an integer; each transmission component includes a first feeding unit, a first transmission line and a second transmission line; the first feeding unit includes a main path portion, a first branch and a second branch, and both the first branch and the second branch are electrically connected with the main path portion; the first branch in the transmission component is electrically connected with the first transmission line, and the second branch in the transmission component is electrically connected with the second transmission line;

in response to that n=1, the first transmission line and the second transmission line of each transmission component are respectively electrically connected with two different antenna units, and the antenna unit connected with first transmission line is different from the antenna unit connected with second transmission line;

in response to that n>1, the first transmission line and the second transmission line of each transmission component in the $n^{th}$ stage are respectively electrically connected with two different antenna units, and the antenna units connected with first transmission lines and second transmission lines are different; the first transmission line and the second transmission line of each transmission component in an $i^{th}$ stage are electrically connected with two different main path portions in an $(i+1)^{th}$ stage respectively, and the main path portions connected with the first transmission lines and the second transmission lines are different, where $1 \leq i < n$, and i is an integer; and at least part of the transmission components each further include a phase shift unit, in the transmission component including the phase shift unit, two ends of a first main line of the phase shift unit are respectively electrically connected with the first branch of the first feeding unit and the first transmission line, and two ends of a second main line of the phase shift unit are respectively electrically connected with the second branch of the first feeding unit and the second transmission line.

In some implementations, the phase shift unit further includes a first dielectric substrate and a second dielectric substrate disposed opposite to each other, a plurality of patch electrodes spaced apart from each other, and an adjustable dielectric layer;

the adjustable dielectric layer in the phase shift unit is located between the first dielectric substrate and the second dielectric substrate; the first main line and the second main line are located on a side, close to the adjustable dielectric layer, of the first dielectric substrate; the patch electrodes are located on a side, close to the adjustable dielectric layer, of the second dielectric substrate;

in the phase shift unit, the patch electrodes are arranged side by side in an extending direction in which the first main line extends, and the first main line and the second main line both at least overlap orthographic projections of the patch electrodes on the first dielectric substrate.

In some implementations, the phase shift unit further includes a first dielectric substrate and a second dielectric substrate disposed opposite to each other, first branch portions, second branch portions, and an adjustable dielectric layer;

the adjustable dielectric layer in the phase shift unit is located between the first dielectric substrate and the second dielectric substrate; the first main line and the first branch portions are located on a side of the first dielectric substrate close to the adjustable dielectric layer, and the second main line and the second branch portions are located on a side of the second dielectric substrate close to the adjustable dielectric layer; the first branch portions are connected to a side of the first main line in an extending direction in which the first main line extends, and the second branch portions are connected to a side of the second main line in an extending direction in which the second main line extends;

in the phase shift unit, orthographic projections of one of the first branch portions and one of the second branch portions on the first dielectric substrate at least partially overlap to define an overlapping region, and the overlapping region is located between orthographic projections of the first main line and the second main line on the first dielectric substrate.

In some implementations, the phase shift unit further includes a first dielectric substrate and a second dielectric substrate disposed opposite to each other, a first reference sub-electrode, a second reference sub-electrode, a third reference sub-electrode, a plurality of patch electrodes spaced apart from each other, and an adjustable dielectric layer;

the adjustable dielectric layer in the phase shift unit is located between the first dielectric substrate and the second dielectric substrate; the first reference sub-electrode, the second reference sub-electrode, the third reference sub-electrode, the first main line and the second main line are located on a side of the first dielectric substrate close to the adjustable dielectric layer; the first main line is located between the first reference sub-electrode and the second reference sub-electrode, and the second main line is located between the second reference sub-electrode and the third reference sub-electrode; the patch electrodes are located on a side, close to the adjustable dielectric layer, of the second dielectric substrate;

in the phase shift unit, the patch electrodes are arranged side by side in an extending direction in which the first main line extends, and the first reference sub-electrode, the second reference sub-electrode, the third reference sub-electrode, the first main line and the second main line at least overlap orthographic projections of the patch electrodes on the first dielectric substrate.

In some implementations, the antenna further includes a reference electrode layer located on a side of the first dielectric substrate away from the adjustable dielectric layer; the first reference sub-electrode, the second reference sub-electrode and the third reference sub-electrode are all electrically connected with the reference electrode layer through via holes penetrating through the first dielectric substrate.

In some implementations, the antenna further includes a third dielectric substrate and a reference electrode layer, the third dielectric substrate is located on a side, away from the first dielectric substrate, of the reference electrode layer, the first feeding unit, the first transmission line and the second transmission line of the transmission component are located on a side, away from the reference electrode layer, of the third dielectric substrate.

In some implementations, the reference electrode layer is provided with a first opening, a second opening, a third opening, and a fourth opening therein, in the transmission component including the phase shift unit, a first end of the first main line is coupled with the first branch of the first feeding unit through the first opening, a second end of the first main line is coupled with the first transmission line through the second opening, a first end of the second main line is coupled with the second branch of the first feeding unit through the third opening, and a second end of the second main line is coupled with the second transmission line through the fourth opening.

In some implementations, the antenna units are located on a side of the third dielectric substrate away from the dielectric layer.

In some implementations, the third dielectric substrate includes a printed circuit board.

In some implementations, at least a part of first feeding units each include a BALUN component.

In some implementations, the main path portion, the first branch and the second branch of the BALUN component are formed into one piece, and one of the first branch and the second branch is in a shape of a straight line and the other of the first branch and the second branch is in a shape of a meandering line.

In some implementations, an interlayer insulating layer is arranged on a side, away from the third dielectric substrate, of the reference electrode layer, the main path portion of the BALUN component is located on a side of the interlayer insulating layer away from the third dielectric substrate, the first branch and the second branch of the BALUN component are located on a side of the third dielectric substrate away from the interlayer insulating layer, and an orthographic projection of the main path portion on the third dielectric substrate is located between orthographic projections of the first branch and the second branch on the third dielectric substrate; the reference electrode layer is provided with a fifth opening therein, an extending direction in which the fifth opening extends is intersected with an extending direction in which the main path portion extends, and orthographic projections of the main path portion, the first branch and the third branch on the third dielectric substrate each pass through an orthographic projection of the fifth opening on the third dielectric substrate, and one of the first branch and the second branch is in a shape of a straight line, and the other of the first branch and the second branch is in a shape of a meandering line.

In some implementations, an interlayer insulating layer is arranged on a side, away from the third dielectric substrate, of the reference electrode layer, the main path portion of the BALUN component is located on a side of the interlayer insulating layer away from the third dielectric substrate, the first branch and the second branch of the BALUN component are located on a side of the third dielectric substrate away from the interlayer insulating layer, and an orthographic projection of a partial structure of the main path portion on the third dielectric substrate is located between an orthographic projection of a partial structure of the first branch on the third dielectric substrate and an orthographic projection of a partial structure of the second branch on the third dielectric substrate, the reference electrode layer is provided with a fifth opening therein, the main path portion, the first branch and the third branch each include a portion whose orthographic projection on the third dielectric substrate passes through an orthographic projection of the fifth opening on the third dielectric substrate, and the main path portion, the first branch and the second branch are all in a shape of a meandering line.

In some implementations, the main path portion, the first branch and the second branch of the BALUN component are formed into one piece, and the main path portion, the first branch and the second branch are all in a shape of a meandering line, and widths of the first branch and the second branch are different.

In some implementations, the antenna further includes a reference electrode layer located on a side of the second dielectric substrate away from the adjustable dielectric layer, and the first feeding unit, the first transmission line and the second transmission line are all located on a side, close to the adjustable dielectric layer, of the first dielectric substrate.

In some implementations, the antenna units are located on a side of the first dielectric substrate close to the adjustable dielectric layer.

In some implementations, the antenna units a located on a side of the first dielectric substrate away from the adjustable dielectric layer.

In some implementations, lengths of the first branch and the second branch in at least the transmission component having the phase shift unit are different, lengths of the first transmission line and the second transmission line are different, and a difference between the lengths of the first branch and the second branch is equal to a difference between the lengths of the second transmission line and the first transmission line.

In some implementations, a spacing between two antenna units connecting with a same transmission component is equal to one-half wavelength.

In some implementations, the antenna unit includes any one of a radiation antenna, a dipole, a slot antenna.

In some implementations, each transmission component includes the phase shift unit.

In some implementations, the antenna includes multiple stages of transmission components, and each transmission component in at least one stage includes the phase shift unit, or a part of the transmission components in at least one stage each include the phase shift unit, or each transmission component in at least one stage includes no phase shift unit.

In some implementations, the antenna includes multiple stages of transmission components, and each transmission component in a part of stages includes the phase shift unit, and each transmission component in the rest part of stages includes no phase shift unit.

In a second aspect, an embodiment of the present disclosure provides an antenna system, which includes the antenna described above.

In some implementations, the antenna system further includes:

- a transceiving unit configured to transmit or receive a signal;
- a radio frequency transceiver connected with the transceiving unit and configured to modulate the signal transmitted by the transceiving unit or demodulating a signal received by the antenna and then transmit the signal to the transceiving unit;
- a signal amplifier connected with the radio frequency transceiver and configured to improve a signal-to-noise ratio of the signal output by the radio frequency transceiver or the signal received by the antenna;
- a power amplifier connected with the radio frequency transceiver and configured to amplify a power of the signal output by the radio frequency transceiver or the signal received by the antenna; and
- a filtering unit connected with the signal amplifier, the power amplifier and the antenna, and is configured to filter a signal received and then transmit a filtered signal to the antenna or filter the signal received by the antenna.

DETAIL DESCRIPTION OF EMBODIMENTS

In order to make the technical solutions of the present disclosure better understood, the present disclosure is further described in detail below with reference to the accompanying drawings and implementations.

Unless defined otherwise, technical or scientific terms used herein shall have the ordinary meaning as understood by one of ordinary skill in the art to which the present disclosure belongs. The terms “first,” “second,” and the like, as used in the description, do not denote any order, quantity, or importance, but rather are used to distinguish one element from another. Also, the use of the terms “a,” “an,”, “the” or the like does not denote a limitation of quantity, but rather denotes the presence of at least one. The word “comprising/including” or “comprises/includes”, and the like, means that the element or item preceding the word contains the element or item listed after the word and its equivalent, but does not exclude other elements or items. The terms “connecting” or “coupling” and the like are not restricted to physical or mechanical connections, but may include electrical connections, whether direct or indirect. The words “upper/on”, “lower/below”, “left”, “right”, and the like are used only to indicate relative positional relationships, and when an absolute position of the object being described is changed, the relative positional relationships may be changed accordingly.

A BALUN (balun-unbalance) component is a three-port device that can be applied to a microwave radio frequency device, and the BALUN component is a radio frequency transmission line transformer that converts a matching input into a differential input, and may be configured to excite a differential line, an amplifier, a wideband antenna, a balanced mixer, a balanced frequency multiplier and modulator, a phase shifter, and any circuit that is to transmit two signals with the same amplitude and a phase difference of 180° therebetween on two lines. Two outputs of the BALUN component are the same in amplitude and opposite in phase, which means that, in the frequency domain, there is a phase difference of 180° between the two outputs, and in the time domain, a voltage of one balanced output has a value opposite to that of a voltage of the other balanced output.

Figure 1:
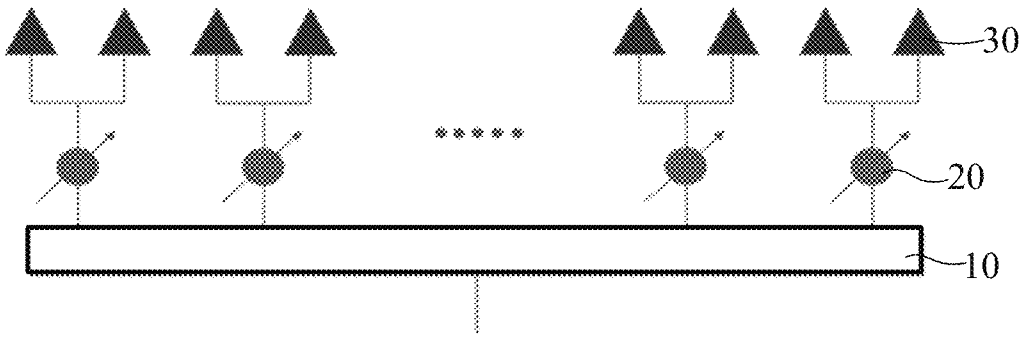
FIG. 1 is a schematic diagram of an architecture of an antenna in the related art.
Figure 2:
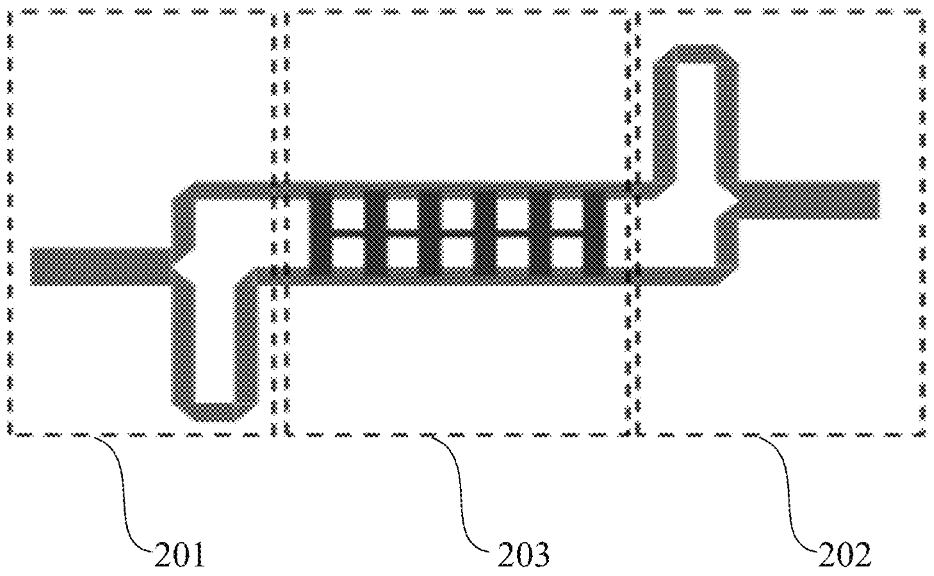
FIG. 2 is a schematic diagram of a phase shifter in the related art.

A differential liquid crystal phase shifter is mainly characterized in that the differential liquid crystal phase shifter works in a differential mode state and has higher phase shifting efficiency compared with a single-line phase shifter. However, in order to provide a differential mode signal, a BALUN component 201 and a BALUN component 202 are respectively added at an input terminal and an output terminal of the phase shifter, as shown in FIG. 2, so as to complete an unbalance-balance-unbalance conversion of a signal, which means that extra volume and insertion loss are added in addition to the phase shifting portion 203. An embodiment of the present disclosure provides a phased array antenna architecture based on a differential liquid crystal phase shifter by effectively combining the differential liquid crystal phase shifter with a power division feeding network of an array antenna, and compared with a traditional phased array antenna in which the phase shifter is directly and simply replaced by the liquid crystal phase shifter, the phased array antenna architecture in the present disclosure has advantages in various aspects such as loss, cost and volume. Since the phased array antenna architecture in the present disclosure is based on a TFT-LCD process amd may be formed on a substrate in one step, and compared with the phased array antenna adopting a traditional phase shifter, the phased array antenna in the present disclosure has higher design freedom without increasing implementation complexity and cost.

Figure 3:
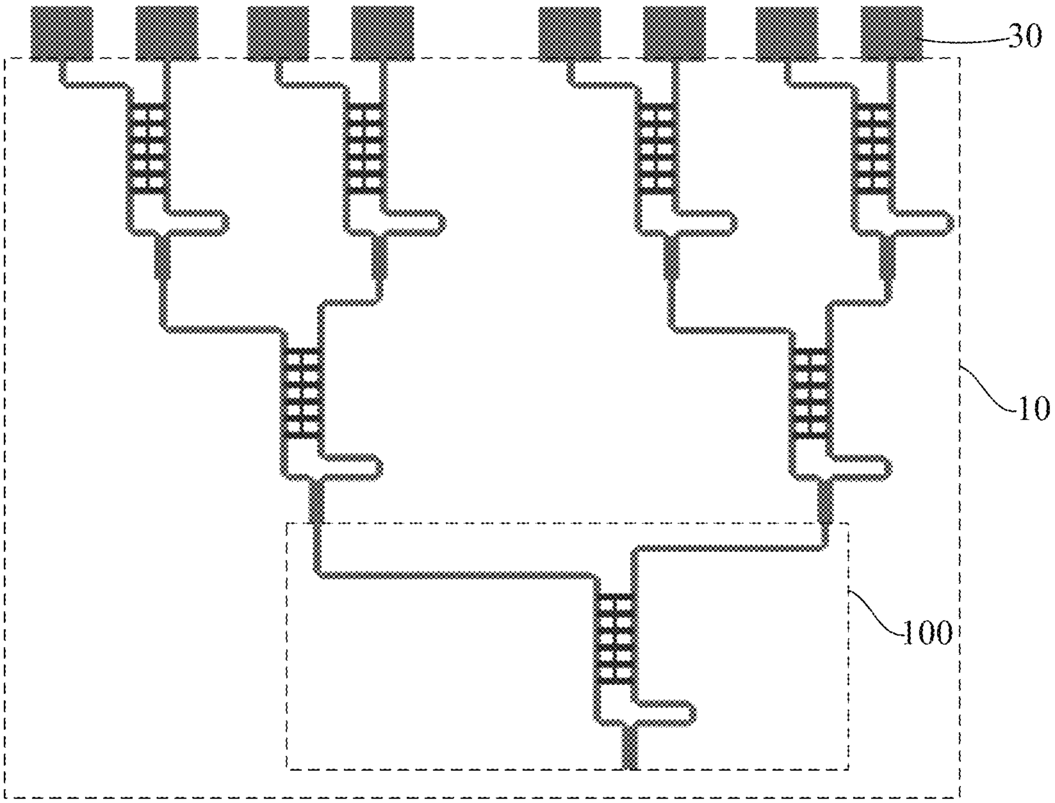
FIG. 3 is a schematic diagram of an architecture of an antenna in a first implementation according to an embodiment of the present disclosure.
Figure 4:
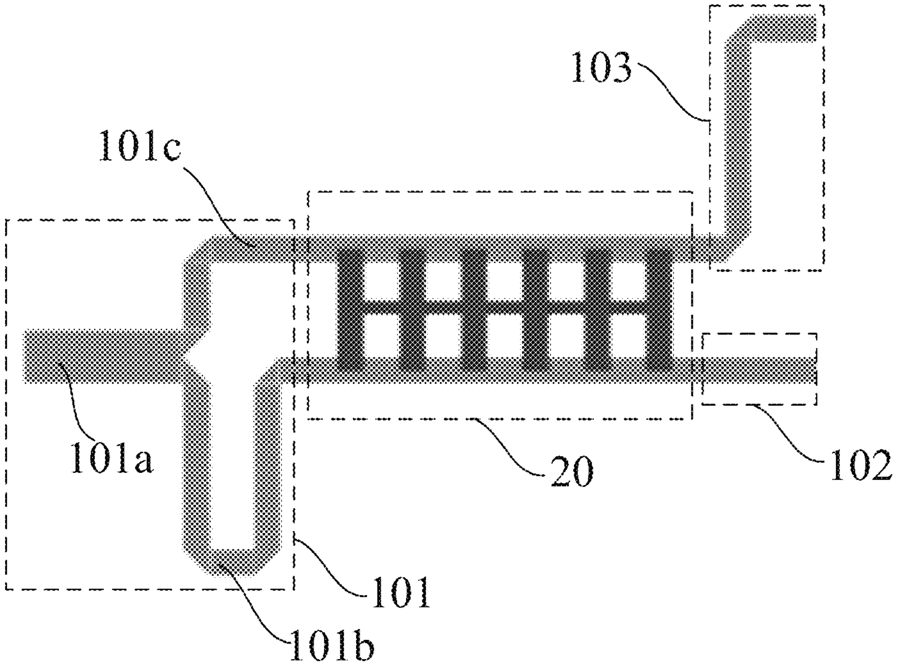
FIG. 4 is a schematic diagram of a transmission component according to an embodiment of the present disclosure.

In a first aspect, FIG. 3 is a schematic diagram of an architecture of an antenna according to an embodiment of the present disclosure; FIG. 4 is a schematic diagram of a transmission component 100 according to an embodiment of the present disclosure; as shown in FIGS. 3 and 4, an embodiment of the present disclosure provides an antenna, including a feeding network 10 and a plurality of antenna units 30 electrically connected to the feeding network 10. The feeding network 10 includes n stages of transmission components 100. Each stage includes $2^{n-1}$ transmission components 100, n is equal to or greater than 1 and is an integer. Each transmission component 100 includes a first feeding unit, a first transmission line 102, and a second transmission line 103. The first feeding unit includes a main path portion 101*a*, a first branch 101*b* and a second branch 101*c*, and the first branch 101*b* and the second branch 101*c* are electrically connected with the main path portion 101*a*. The first branch 101*b* of the transmission component 100 is electrically connected to the first transmission line 102, and the second branch 101*c* of the transmission component 100 is electrically connected to the second transmission line 103.

In the antenna according to the embodiment of the present disclosure, in a case of n=1, the first transmission line and the second transmission line of each transmission component are respectively electrically connected to two different antenna units, and the antenna unit connected to the first transmission line is different from the antenna unit connected to the second transmission line. In a case of n>1, the first transmission line 102 and the second transmission line 103 of each transmission component 100 in the $n^{th}$ stage are electrically connected to two different antenna units 30, respectively, and the antenna units 30 connected to the first transmission lines 102 are different from the antenna units 30 connected to the second transmission lines 103. The first transmission line 102 and the second transmission line 103 of each transmission component 100 in the $i^{th}$ stage are respectively electrically connected to two different main path portions 101*a* in the $(i+1)^{st}$ stage, and the main path portions 101*a* connected to the first transmission lines 102 are different from the main path portions 101*a* connected to the second transmission lines 103, i is greater than or equal to 1 and less than n, and i is an integer.

For example, as shown in FIG. 3, in a case where of n=3, a transmission structure in a first stage includes one transmission component 100, a transmission structure in a second stage includes two transmission components 100, and a transmission structure in a third stage includes four transmission components 100. The first transmission line 102 and the second transmission line 103 in the transmission component 100 in the first stage are respectively connected to the main path portions 101*a* of the first feeding units of the two transmission components 100 in the second stage, the first transmission lines 102 and the second transmission lines 103 (two first transmission lines 102 and two second transmission lines 103) of the two transmission components 100 in the second stage are respectively connected to the main path portions 101*a* of the first feeding units of the four transmission components 100 in the third stage, and the first transmission lines 102 and the second transmission lines 103 (four first transmission lines 102 and four second transmission lines 103) of the four transmission components 100 in the third stage are respectively connected to eight antenna units 30.

In particular, in the embodiment of the present disclosure, each of at least a part of the transmission components 100 includes a phase shift unit 20 therein. For the transmission component 100 including the phase shift unit 20, two ends of a first main line 21 of the phase shift unit 20 are electrically connected to the first branch 101*b* and the first transmission line 102, respectively, and two ends of a second main line 22 of the phase shift unit 20 are electrically connected to the second branch 101*c* and the second transmission line 103, respectively. That is to say, during the antenna transmitting a microwave signal, the microwave signal fed into the main path portion 101*a* of the first feeding unit of the transmission component 100 is transmitted to the phase shift unit 20 through the first branch 101*b* and the second branch 101*c*, is phase-shifted by the phase shift unit 20, and then is fed out through the first transmission line 102 and the second transmission line 103. During the antenna receiving a microwave signal, the first transmission line 102 and the second transmission line 103 of the transmission component 100 feed the microwave signal into the phase shift unit 20, and after being phase-shifted by the phase shift unit 20, the microwave signal is combined by the first branch 101*b* and the second branch 101*c* of the first feeding unit, and then fed out by the main path portion 101*a*.

In the antenna of the embodiment of the present disclosure, the phase shift unit 20 is integrated into the feeding network 10 of the antenna, so that not only the efficient phase shift function of the dual-line phase shift unit 20 is exerted, but also extra loss caused by the independent power division/power combination of the feeding units in the feeding network 10 is avoided.

In the antenna of the embodiment of the present disclosure, the phase shift unit 20 may adopt a differential mode dual-line phase shifter in any form. The phase shift unit 20 in the embodiment of the present disclosure is described below with reference to specific examples. An adjustable dielectric layer in the phase shift unit includes, but is not limited to, a liquid crystal layer, and the embodiment of the present disclosure is described by taking the liquid crystal layer serving as the adjustable dielectric layer as an example.

Figure 5:
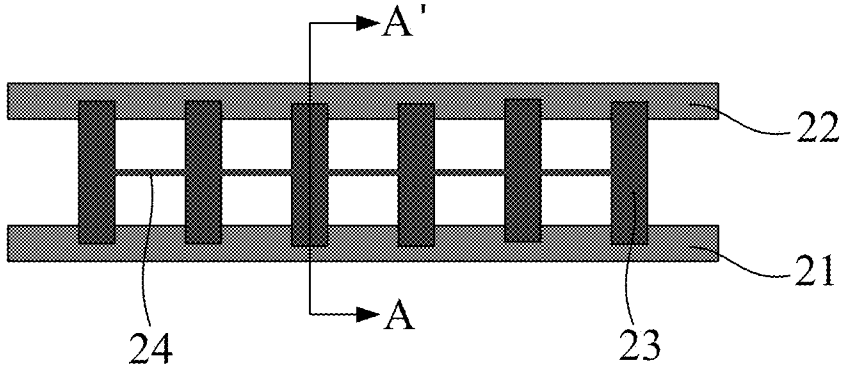
FIG. 5 is a schematic diagram of a phase shift unit in a first example of an embodiment of the present disclosure.
Figure 6:
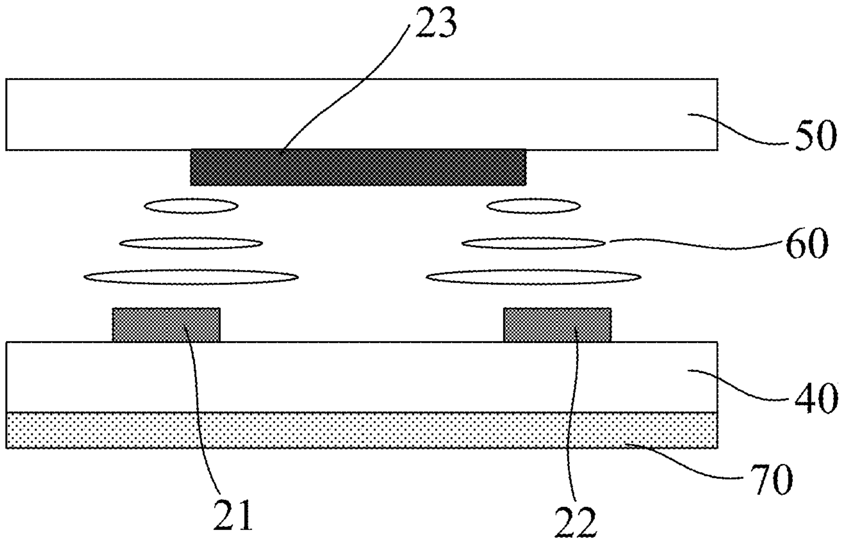
FIG. 6 is a cross-sectional view taken alone line A-A' in FIG. 5.

FIG. 5 is a schematic diagram of a phase shift unit 20 in a first example of an embodiment of the present disclosure; FIG. 6 is a cross-sectional view taken along line A-A' in FIG. 5. As shown in FIGS. 5 and 6, the phase shift unit 20 includes a first dielectric substrate 40 and a second dielectric substrate 50 which are disposed opposite to each other, a first main line 21, a second main line 22, a plurality of patch electrodes 23 which are disposed at intervals, and a liquid crystal layer 60. The liquid crystal layer 60 is formed between the first dielectric substrate 40 and the second dielectric substrate 50. Extending directions in which the first main line 21 and the second main line 22 extend are the same, and the first main line 21 and the second main line 22 are both disposed on a side of the first dielectric substrate 40 close to the liquid crystal layer 60; the patch electrodes 23 arranged at intervals are arranged side by side along the extending direction in which the first main line 21 extends, and the patch electrodes 23 are arranged on a side of the second dielectric substrate 50 close to the liquid crystal layer 60. Orthographic projections of two ends, which are opposite to each other in a direction in which each patch electrode 23 extends, of each patch electrode 23 on the first dielectric substrate 40 overlap orthographic projections of the first main line 21 and the second main line 22 on the first dielectric substrate 40, respectively. In such case, overlapping regions at which the orthographic projections of the first main line 21 and the second main line 22 overlap the orthographic projection of the patch electrode 23 form capacitance regions, respectively, and by applying different voltages to the first main line 21, the second main line 22, and the patch electrode 23, an electric field is formed in the overlapping region between the first main line 21 and the patch electrode 23, and an electric field is also formed in the overlapping region between the second main line 22 and the patch electrode 23, so that dielectric constants of liquid crystal molecules in the overlapping region between the first main line 21 and the patch electrode 23 and the overlapping region between the second main line 22 and the patch electrode 23 are changed, thereby achieving phase shifting of the microwave signal.

It should be noted that the phase shift unit 20 shown in FIG. 6 further includes a reference electrode layer 70, and actually an operation of the phase shift unit 20 does not depend on the reference electrode layer 70, and in a case where the phase shift unit 20 is integrated into the antenna, one or more reference electrode layers 70 are desired to be provided. Certainly, if the antenna itself has integrated the reference electrode layer 70 therein, the reference electrode layer 70 in the antenna may be shared as the reference electrode layer 70 of the phase shift unit 20. The reference electrode layer 70 may be disposed on a side of the first dielectric substrate 40 away from the liquid crystal layer 60, or may be disposed on a side of the second dielectric substrate 50 away from the liquid crystal layer 60. In addition, the reference electrode layer 70 includes, but is not limited to, a ground layer, so long as that the reference electrode layer 70 may form a current loop with the first main line 21 and the patch electrode 23, and form a current loop with the second main line 22 and the patch electrode 23.

In some examples, the patch electrodes 23 in the phase shift unit 20 may be electrically connected together through a connection electrode 24, and during the phase shift unit 20 operating, the patch electrodes 23 may be applied with a same bias voltage, thereby facilitating to be controlled. An orthographic projection of the connection electrode 24 on the first dielectric substrate 40 is not overlapped with the orthographic projections of the first main line 21 and the second main line 22 on the first dielectric substrate 40.

In some examples, the patch electrodes 23 in the phase shift unit 20 are arranged periodically, for example, intervals between every two adjacent patch electrodes 23 are the same. In some examples, areas of the overlapping regions between the orthographic projections of the respective patch electrodes 23 and the first main line 21 on the first dielectric substrate 40 are equal to each other; and/or areas of the overlapping regions between the orthographic projections of the respective patch electrodes 23 and the second main line 22 on the first dielectric substrate 40 are equal to each other. In such way, the control of the phase shift unit 20 can be facilitated. Further, widths of the patch electrodes 23 may be the same, and lengths of the patch electrodes 23 may be the same.

In some examples, the first main line 21 and the second main line 22 in the phase shift unit 20 each may employ a transmission line in a shape of a straight-line segment. The extending directions in which the first main line 21 and the second main line 22 extend may be in parallel with each other, which contributes to miniaturization of the phase shift unit 20, that is, contributes to high integration of the antenna. Certainly, the first main line 21 and the second main line 22 may also be curved, and shapes of the first main line 21 and the second main line 22 are not limited in the present disclosure.

In some examples, in a case where the first feeding unit, the first transmission line 102, and the second transmission line 103 in the transmission component 100 and the first main line 21 are disposed on the first dielectric substrate 40, the first branch 101*b* of the first feeding unit, the first main line 21 and the first transmission line 102 may be formed into one piece (i.e., a unitary structure), and the second branch 101*c* of the first feeding unit, the second main line 22 and the second transmission line 103 may be formed into one piece. In addition, in this case, the reference electrode layer 70 may be disposed on the side of the second dielectric substrate 50 away from the liquid crystal layer 60. The antenna units 30 in the antenna may be disposed on the side of the first dielectric substrate 40 close to the liquid crystal layer 60, or may be disposed on a side of the first dielectric substrate 40 away from the liquid crystal layer 60. In a case where the antenna units 30 are disposed on the side of the first dielectric substrate 40 close to the liquid crystal layer 60, each antenna unit 30 may be directly and electrically connected to the first transmission line 102 or the second transmission line 103 in the transmission component 100 in the $n^{th}$ stage corresponding to the antenna unit. In a case where the antenna units 30 are disposed on the side of the first dielectric substrate 40 away from the liquid crystal layer 60, each antenna unit 30 may be electrically connected to the first transmission line 102 or the second transmission line 103 of the transmission component 100 in the $n^{th}$ stage, corresponding to the antenna unit, through a via hole penetrating through the first dielectric substrate 40, or may be electrically connected to the first transmission line 102 or the second transmission line 103 of the transmission component 100 in the $n^{th}$ stage, corresponding to the antenna unit, by coupling.

In some examples, in a case where the first feeding unit, the first transmission line 102 and the second transmission line 103 are disposed on different dielectric substrates from the first main line 21, the first branch 101*b* of the first feeding unit and the first transmission line 102 may be electrically connected to the first main line 21 by a method including, but not limited to, soldering or coupling, and similarly, the second branch 101*c* of the first feeding unit and the second transmission line 103 may be electrically connected to the second main line 22 by a method including, but not limited to, soldering or coupling.

Figure 7:
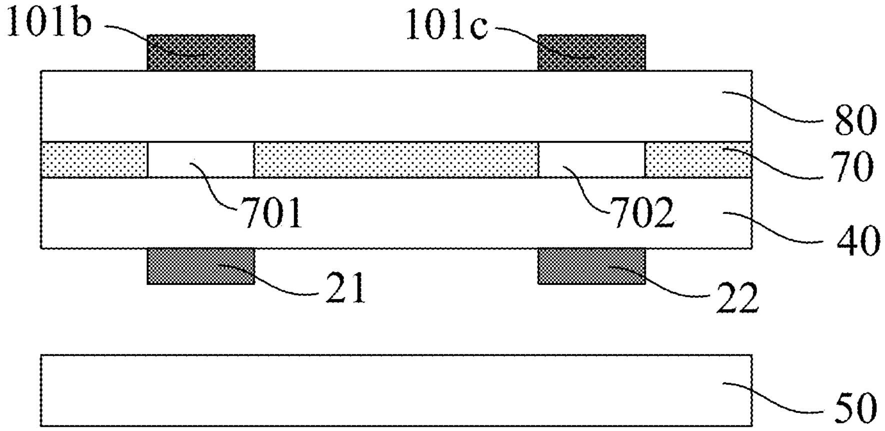
FIG. 7 is a schematic diagram illustrating a positional relationship between a first branch, a second branch, a first main line, and a second main line in a transmission component having the phase shift unit of FIG. 5.
Figure 8:
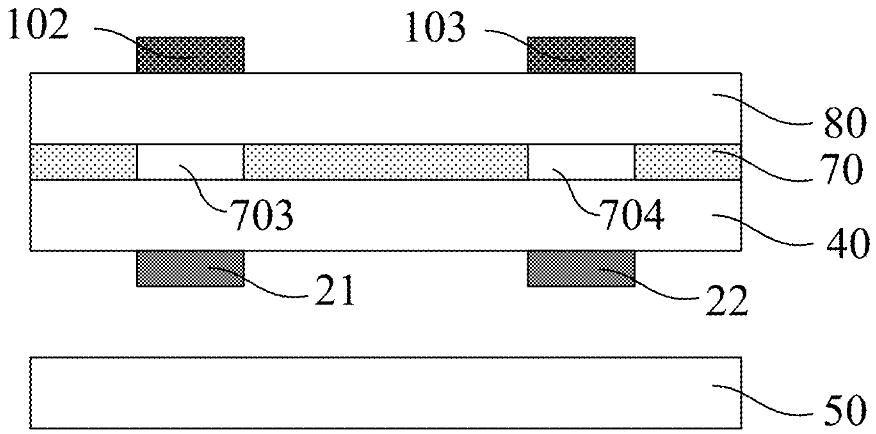
FIG. 8 is a schematic diagram illustrating a positional relationship between a first transmission line, a second transmission line, a first main line, and a second main line in a transmission component having the phase shift unit of FIG. 5.

For example, FIG. 7 is a schematic diagram illustrating a positional relationship between the first branch 101*b*, the second branch 101*c*, the first main line 21, and the second main line 22 in the transmission component 100 having the phase shift unit 20 of FIG. 5; FIG. 8 is a schematic diagram illustrating a positional relationship between the first transmission line 102, the second transmission line 103, the first main line 21, and the second main line 22 in the transmission component 100 having the phase shift unit 20 of FIG. 5; as shown in FIGS. 7 and 8, the antenna further includes a third dielectric substrate 80, the reference electrode layer 70 is disposed between the first dielectric substrate 40 and the third dielectric substrate 80, and the first feeding unit, the first transmission line 102 and the second transmission line 103 of the transmission component 100 are all disposed on the third dielectric substrate 80. The reference electrode layer 70 is provided with a first opening 701, a second opening 702, a third opening 703, and a fourth opening 704. The first main line 21 and the second main line 22 each include a first end and a second end disposed opposite to each other in an extending direction in which each of the first main line 21 and the second main line 22 extends. In the transmission component 100 with the phase shift unit 20, the first end of the first main line 21 is coupled to the first branch 101*b* of the first feeding unit through the first opening 701, and the second end of the first main line 21 of the phase shift unit 20 is coupled to the first transmission line 102 through the second opening 702; the first end of the second main line 22 is coupled to the second branch 101*c* of the first feeding unit through the third opening 703, and the second end of the second main line 22 is coupled to the second transmission line 103 through the fourth opening 704.

Figure 9:
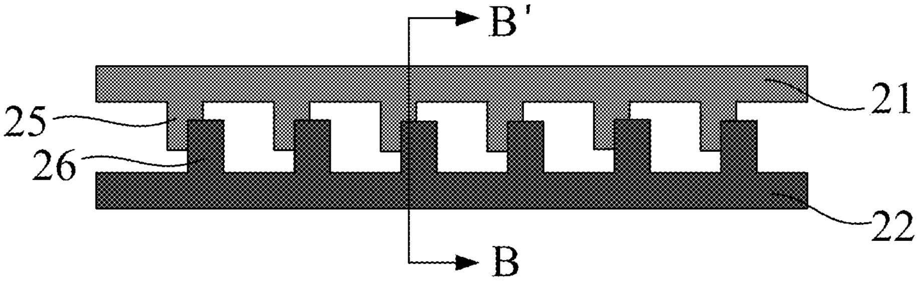
FIG. 9 is a schematic diagram of a phase shift unit in a second example of an embodiment of the present disclosure.
Figure 10:
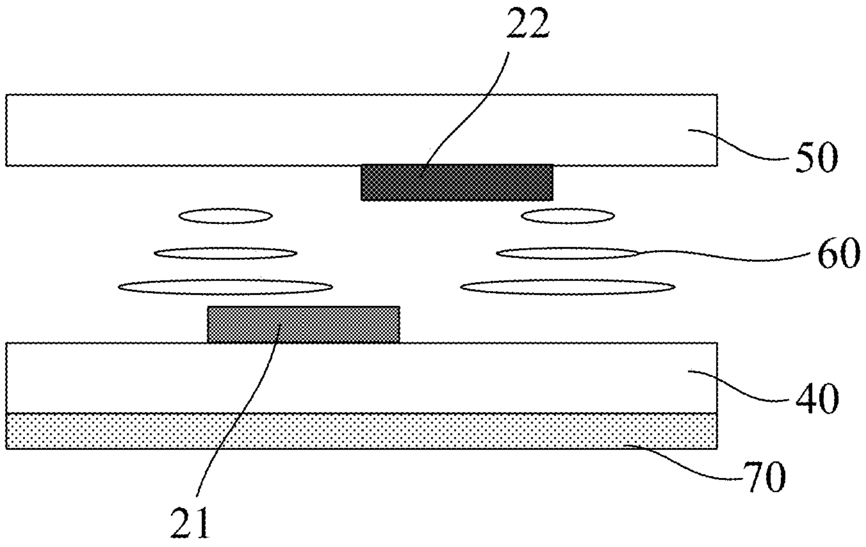
FIG. 10 is a cross-sectional view taken along line B-B' of FIG. 9.

FIG. 9 is a schematic diagram of the phase shift unit 20 in a second example of an embodiment of the present disclosure; FIG. 10 is a cross-sectional view taken along line B-B' of FIG. 9, as shown in FIGS. 9 and 10, the phase shift unit 20 includes a first dielectric substrate 40 and a second dielectric substrate 50 disposed opposite to each other, a first main line 21, a second main line 22, a first branch portion 25, a second branch portion 26, and a liquid crystal layer 60. The liquid crystal layer 60 is arranged between the first dielectric substrate 40 and the second dielectric substrate 50. The first branch portion 25 is connected to a side of the first main line 21 in an extending direction in which the first main line 21 extends, and the first main line 21 and the first branch portion 25 are all provided on a side of the first dielectric substrate 40 close to the liquid crystal layer 60. The second branch portion 22 is connected to a side of the second main line 22 in an extending direction in which the second main line 22 extends, and the second main line 22 and the second branch portion 26 are all provided on a side of the second dielectric substrate 50 close to the liquid crystal layer 60. An orthographic projection of the first branch portion 25 on the first dielectric substrate 40 at least partially overlap an orthographic projection of the second branch portion 26 on the first dielectric substrate 40, so as to define an overlapping region (i.e., a capacitance region), and the overlapping region is located between orthographic projections of the first main line 21 and the second main line 22 on the first dielectric substrate 40. By applying bias voltages to the first main line 21 and the second main line 22, an electric field is formed in the capacitance region to change a dielectric constant of the liquid crystal molecules, thereby realizing a phase shift of a microwave signal.

It should be noted that FIG. 10 further illustrates the reference electrode layer 70, and a arrangement manner of the reference electrode layer 70 is the same as that in the first example, and therefore, the description thereof is omitted here.

In some examples, multiple first branch portions 25 and multiple second branch portions 22 are provided, and the first branch portions 25 are provided in correspondence with the second branch portions 26 one to one. Further, the first branch portions 25 are periodically arranged, and similarly, the second branch portions 26 are also periodically arranged. For example, intervals between every two adjacent first branch portions 25 are the same; intervals between every two adjacent second branch portions 22 are the same. In some examples, areas of overlapping regions of the orthographic projections of the first branch portions 25 and the second branch portions 22 on the first dielectric substrate 40 are all the same. For example, the first branch portions 25 have a same width, and the second branch portions 22 have a same width, certainly, the first branch portions 25 may have a same length, and the second branch portions 22 may have a same length.

In some examples, the first main line 21 and the second main line 22 in the phase shift unit 20 each may employ a transmission line in a shape of a straight-line segment. The extending directions in which the first main line 21 and the second main line 22 extend may be in parallel with each other, which contributes to miniaturization of the phase shift unit 20, that is, contributes to high integration of the antenna. Certainly, the first main line 21 and the second main line 22 may also be curved, and shapes of the first main line 21 and the second main line 22 are not limited in the present disclosure.

In some examples, the first feeding unit, the first transmission line 102, and the second transmission line 103 may be disposed in the same layer as the first main line 21 or may be disposed in the same layer as the second main line 22. Taking a case where the first feeding unit, the first transmission line 102, and the second transmission line 103 are disposed in the same layer as the first main line 21 as an example, in such case, the first branch 101*b* of the first feeding unit, the first main line 21, and the first transmission line 102 may be formed into one piece, and two ends of the second main line 22 respectively overlap with orthographic projections of the second branch 101*c* of the first feeding unit and the second transmission line 103 on the first dielectric substrate 40, so as to electrically connect the second main line 22 with the second branch 101*c* and the second transmission line 103. In addition, in this case, the reference electrode layer 70 may be disposed on a side of the second dielectric substrate 50 away from the liquid crystal layer 60. The antenna units 30 in the antenna may be disposed on a side of the first dielectric substrate 40 close to the liquid crystal layer 60, or may be disposed on a side of the first dielectric substrate 40 away from the liquid crystal layer 60. In a case where the antenna units 30 are disposed on the side of the first dielectric substrate 40 close to the liquid crystal layer 60, each antenna unit 30 may be directly and electrically connected to the first transmission line 102 or the second transmission line 103 in the transmission component 100 in the $n^{th}$ stage corresponding to the antenna unit. In a case where the antenna units 30 are disposed on the side of the first dielectric substrate 40 away from the liquid crystal layer 60, each antenna unit 30 may be electrically connected to the first transmission line 102 or the second transmission line 103 of the transmission component 100 in the $n^{th}$ stage corresponding to the antenna unit 30 through a via hole penetrating through the first dielectric substrate 40, or may be electrically connected to the first transmission line 102 or the second transmission line 103 of the transmission component 100 in the $n^{th}$ stage corresponding to the antenna unit 30 by coupling.

In some examples, the first feeding unit, the first transmission line 102 and the second transmission line 103 are disposed on a different dielectric substrate from the first main line 21 and the second main line 22, and the first branch 101*b* of the first feeding unit and the first transmission line 102 may be electrically connected to the first main line 21 by a method including, but not limited to, soldering or coupling, and similarly, the second branch 101*c* of the first feeding unit and the second transmission line 103 may be electrically connected to the second main line 22 by a method including, but not limited to, soldering or coupling.

Figure 11:
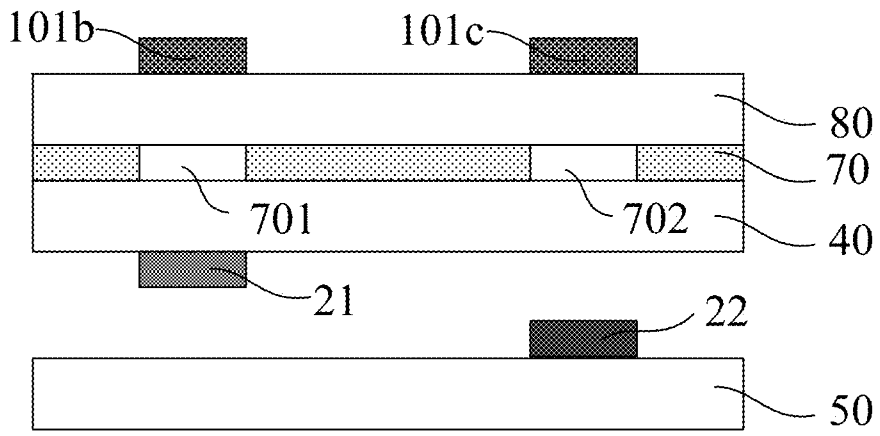
FIG. 11 is a schematic diagram illustrating a positional relationship between a first branch, a second branch, a first main line, and a second main line in a transmission component having the phase shift unit of FIG. 9.
Figure 12:
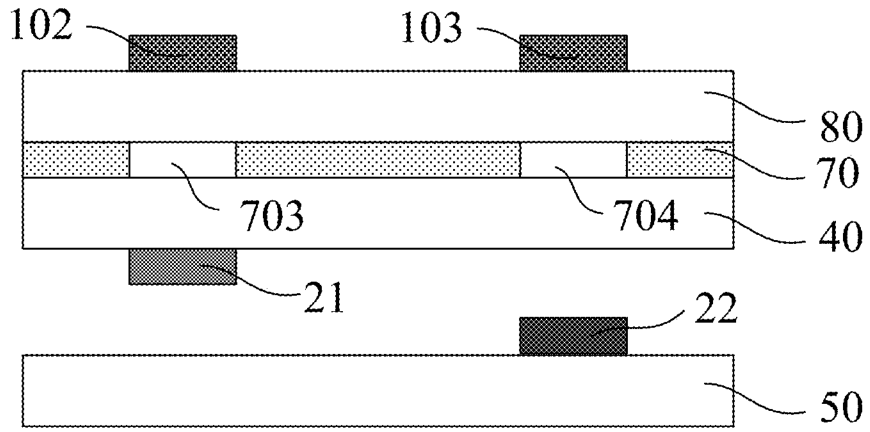
FIG. 12 is a schematic diagram illustrating a positional relationship between a first transmission line, a second transmission line, a first main line, and a second main line in the transmission component having the phase shift unit of FIG. 9.

For example, FIG. 11 is a schematic diagram illustrating a positional relationship between the first branch 101*b*, the second branch 101*c*, the first main line 21, and the second main line 22 in the transmission component 100 having the phase shift unit 20 of FIG. 9; FIG. 12 is a schematic diagram illustrating a positional relationship between the first transmission line 102, the second transmission line 103, the first main line 21, and the second main line 22 in the transmission component 100 having the phase shift unit 20 of FIG. 9; as shown in FIGS. 11 and 12, the antenna further includes a third dielectric substrate 80, the reference electrode layer 70 is disposed between the first dielectric substrate 40 and the third dielectric substrate 80, and the first feeding unit, the first transmission line 102 and the second transmission line 103 of the transmission component 100 are all disposed on the third dielectric substrate 80. The reference electrode layer 70 is provided with a first opening 701, a second opening 702, a third opening 703, and a fourth opening 704. The first main line 21 and the second main line 22 each include a first end and a second end disposed opposite to each other in an extending direction in which the first main line 21 and the second main line 22 extend. In the transmission component 100 with the phase shift unit 20, the first end of the first main line 21 is coupled to the first branch 101*b* of the first feeding unit through the first opening 701, and the second end of the first main line 21 is coupled to the first transmission line 102 through the second opening 702; the first end of the second main line 22 is coupled to the second branch 101*c* of the first feeding unit through the third opening 703, and the second end of the second main line 22 is coupled to the second transmission line 103 through the fourth opening 704.

Figure 13:
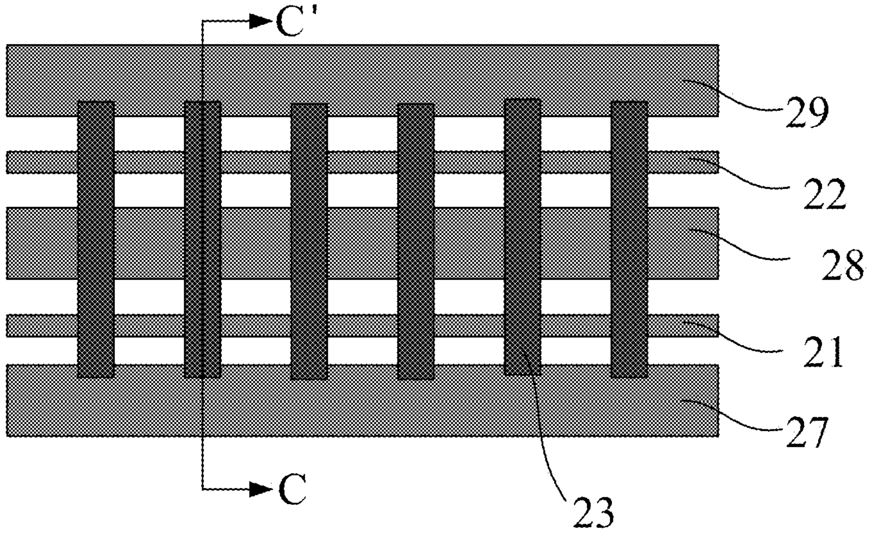
FIG. 13 is a schematic diagram of a phase shift unit in a third example of an embodiment of the present disclosure.
Figure 14:
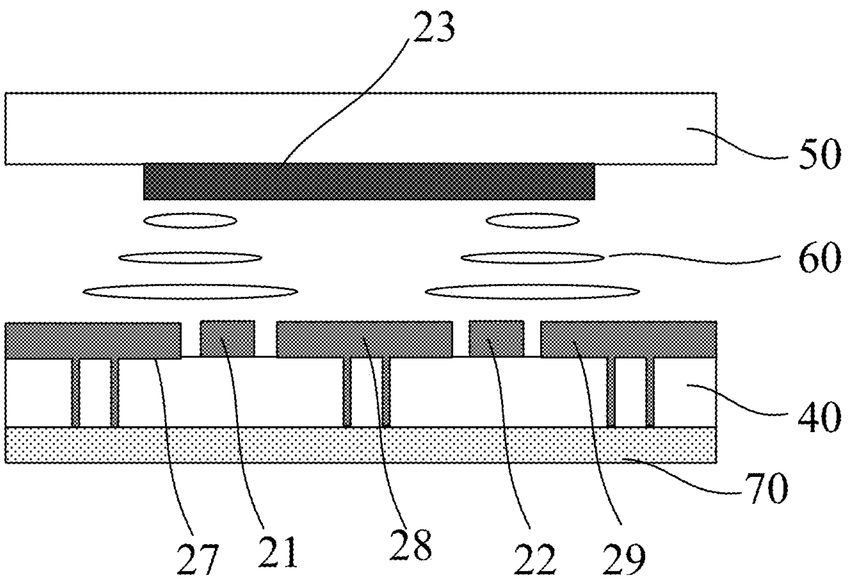
FIG. 14 is a cross-sectional view taken along line C-C' of FIG. 13.

FIG. 13 is a schematic diagram of a phase shift unit 20 in a third example of an embodiment of the present disclosure; FIG. 14 is a cross-sectional view taken along line C-C' of FIG. 13; as shown in FIGS. 13 and 14, the phase shift unit 20 includes a first dielectric substrate 40 and a second dielectric substrate 50 which are disposed opposite to each other, a first main line 21, a second main line 22, a first reference sub-electrode 27, a second reference sub-electrode 28, a third reference sub-electrode 29, a plurality of patch electrodes 23 which are disposed at intervals, and a liquid crystal layer 60. The liquid crystal layer 60 is disposed between the first dielectric substrate 40 and the second dielectric substrate 50. The first reference sub-electrode 27, the second reference sub-electrode 28, the third reference sub-electrode 29, the first main line 21 and the second main line 22 are arranged on a side of the first dielectric substrate 40 close to the liquid crystal layer 60; the first main line 21 is located between the first reference sub-electrode 27 and the second reference sub-electrode 28, and the second main line 22 is located between the second reference sub-electrode 28 and the third reference sub-electrode 29; the patch electrodes 23 are arranged on a side of the second dielectric substrate 50 close to the liquid crystal layer 60. The patch electrodes 23 are arranged side by side in an extending direction in which the first main line 21 extends, and the first reference sub-electrode 27, the second reference sub-electrode 28, the third reference sub-electrode 29, the first main line 21 and the second main line 22 are all at least partially overlapped with orthographic projections of the patch electrodes 23 on the first dielectric substrate 40.

In some examples, the first main line 21, the second main line 22, the first reference sub-electrode 27, the second reference sub-electrode 28, and the third reference sub-electrode 29 each may be in a shape of a straight-line segment, and the first main line 21, the second main line 22, the first reference sub-electrode 27, the second reference sub-electrode 28, and the third reference sub-electrode 29 may constitute a coplanar waveguide transmission line. Extending directions in which the first main line 21, the second main line 22, the first reference sub-electrode 27, the second reference sub-electrode 28, and the third reference sub-electrode 29 extend may be parallel to each other. Certainly, the first main line 21 and the second main line 22 may also be curved, and shapes of the first main line 21 and the second main line 22 are not limited in the embodiments of the present disclosure.

It should be noted that FIG. 14 further illustrates the reference electrode layer 70, and the manner in which the reference electrode layer 70 is arranged is the same as that in the first example, and therefore, the description thereof is omitted here.

In some examples, with continued reference to FIG. 14, the first reference sub-electrode 27, the second reference sub-electrode 28, and the third reference sub-electrode 29 may be applied with the same potential as the reference electrode layer 70, for example, the first reference sub-electrode 27, the second reference sub-electrode 28 and the third reference sub-electrode 29 are electrically connected to the reference electrode layer 70 through via holes penetrating through the first dielectric substrate 40, respectively. The first reference sub-electrode 27 may be electrically connected to the reference electrode layer 70 through one or more via holes, and similarly, each of the second reference sub-electrode 28 and the third reference sub-electrode 29 may also be electrically connected to the reference electrode layer 70 through one or more via holes.

Further, the first feeding unit, the first transmission line 102, and the second transmission line 103 of the transmission component 100 in the antenna may be disposed in the same layer as the first main line 21 and the second main line 22, the first branch 101*b* of the first feeding unit, the first main line 21 and the first transmission line 102 may be formed into one piece, and the second branch 101*c* of the first feeding unit, the second main line 22, and the second transmission line 103 may be formed into one piece. In this case, the antenna units 30 in the antenna may be disposed on a side of the first dielectric substrate 40 close to the liquid crystal layer 60, or may be disposed on the side of the second dielectric substrate 50 close to/away from the liquid crystal layer 60. In a case where the antenna units 30 are disposed on the side of the first dielectric substrate 40 close to the liquid crystal layer 60, each antenna unit 30 may be directly and electrically connected to the first transmission line 102 or the second transmission line 103 in the transmission component 100 in the $n^{th}$ stage, corresponding to the antenna unit, through a via hole penetrating through the first dielectric substrate 40. In a case where the antenna units 30 are disposed on the side of the second dielectric substrate 50 close to/away from the liquid crystal layer 60, each antenna unit 30 may be directly and electrically connected to the first transmission line 102 or the second transmission line 103 in the transmission component 100 in the $n^{th}$ stage corresponding to the antenna unit by coupling.

In a case where the first feeding unit, the first transmission line 102 and the second transmission line 103 are disposed on a different dielectric substrate from the first main line 21, the first branch 101*b* of the first feeding unit and the first transmission line 102 may be electrically connected to the first main line 21 by a method including, but not limited to, soldering or coupling, and similarly, the second branch 101*c* of the first feeding unit and the second transmission line 103 may be electrically connected to the second main line 22 by a method including, but not limited to, soldering or coupling.

Figure 15:
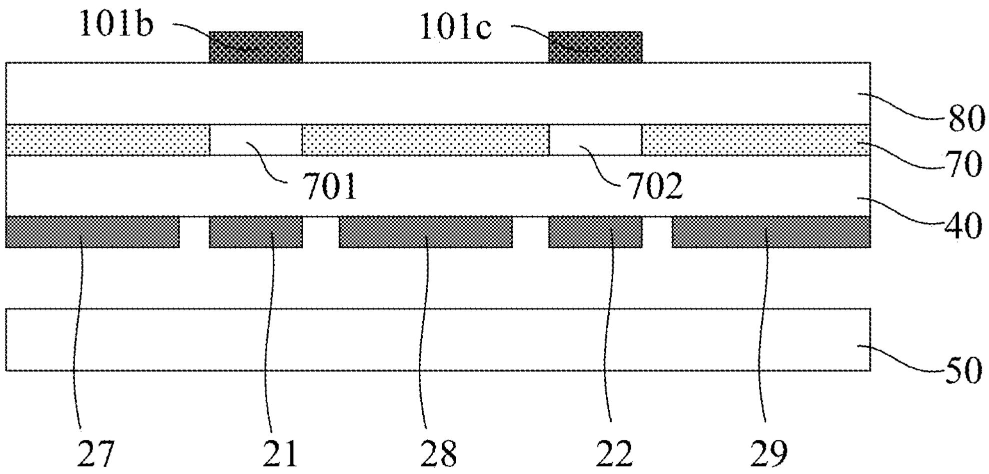
FIG. 15 is a schematic diagram illustrating a positional relationship between a first branch, a second branch, a first main line, and a second main line in a transmission component having the phase shift unit of FIG. 14.
Figure 16:
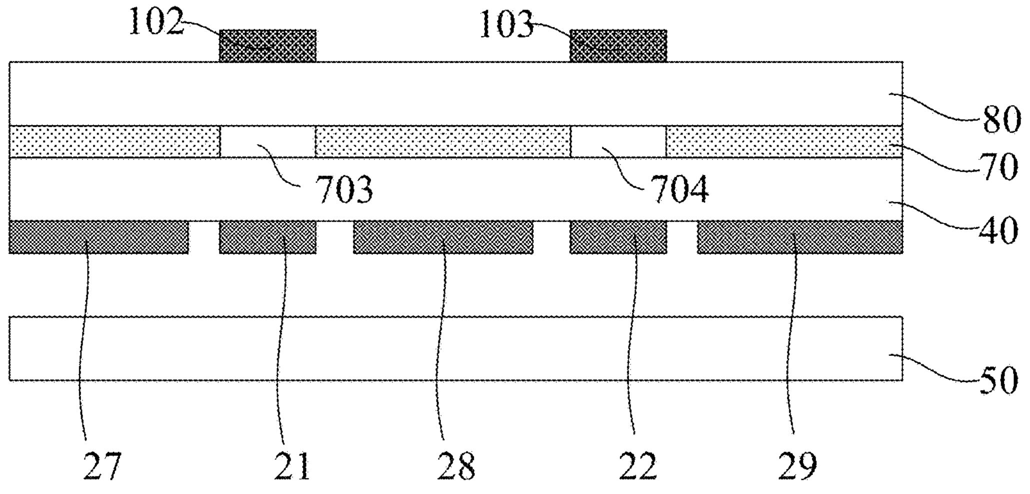
FIG. 16 is a schematic diagram illustrating a positional relationship between a first transmission line, a second transmission line, a first main line, and a second main line in the transmission component having the phase shift unit of FIG. 14.

For example, FIG. 15 is a schematic diagram illustrating a positional relationship between the first branch 101*b*, the second branch 101*c*, the first main line 21, and the second main line 22 in the transmission component 100 having the phase shift unit 20 of FIG. 14; FIG. 16 is a schematic diagram illustrating a positional relationship between the first transmission line 102, the second transmission line 103, the first main line 21, and the second main line 22 in the transmission component 100 having the phase shift unit 20 of FIG. 14; as shown in FIGS. 15 and 16, the antenna further includes a third dielectric substrate 80, the reference electrode layer 70 is disposed between the first dielectric substrate 40 and the third dielectric substrate 80, and the first feeding unit, the first transmission line 102 and the second transmission line 103 of the transmission component 100 are all disposed on the third dielectric substrate 80. The reference electrode layer 70 is provided with a first opening 701, a second opening 702, a third opening 703, and a fourth opening 704. The first main line 21 includes a first end and a second end disposed opposite to each other in an extending direction in which the first main line 21 extends, the second main line 22 includes a first end and a second end disposed opposite to each other in an extending direction in which the second main line 22 extends. In the transmission component 100 with the phase shift unit 20, the first end of the first main line 21 is coupled to the first branch 101*b* of the first feeding unit through the first opening 701, and the second end of the first main line 21 is coupled to the first transmission line 102 through the second opening 702; the first end of the second main line 22 is coupled to the second branch 101*c* of the first feeding unit through the third opening 703, and the second end of the second main line 22 is coupled to the second transmission line 103 through the fourth opening 704.

It should be noted that, only three exemplary architectures of phase shift units 20, and some exemplary arrangements of the transmission component 100 in the antenna unit 30 and the antenna units 30 during adopting these three phase shift units 20 are given above, but the protective scope of the present disclosure is not limited thereto.

In some examples, the antenna may adopt any one architecture described above, and the first feeding unit in the transmission component 100 may be a one-to-two power divider. The first branch 101*b* and the second branch 101*c* of the first feeding unit in the transmission component 100 have different lengths, the first transmission line 102 and the second transmission line 103 have different lengths, and a difference between the lengths of the first branch 101*b* and the second branch 101*c* is equal to a difference between the lengths of the second transmission line 103 and the first transmission line 102. The difference between the lengths of the first branch 101*b* and the second branch 101*c* determines a phase difference between microwave signals transmitted by the first branch 101*b* and the second branch 101*c*, similarly, the difference between the lengths of the first transmission line 102 and the second transmission line 103 determines a phase difference between microwave signals transmitted by the first transmission line 102 and the second transmission line 103. For example, the difference between the lengths of the first branch 101*b* and the second branch 101*c* causes that the phases of the microwave signals transmitted by the first branch 101*b* and the second branches 101*c* are different by 180°, and the difference between the lengths of the second transmission line 103 and the first transmission line 102 causes that the phases of the microwave signals transmitted by the second transmission line 103 and the first transmission line 102 are different by 180°. Taking a case where the antenna receives microwave signals as an example, microwave signals fed in by the main path portion 101*a* are transmitted by the first branch 101*b* and the second branch 101*c*, with phases of the microwave signals transmitted by the first branch 101*b* and the second branch 101*c* being different by 180°, and then the microwave signals are restored by the first transmission line 102 and the second transmission line 103, so that the microwave signals fed out by the first transmission line 102 and the second transmission line 103 are the same in amplitude and phase.

Figure 17:
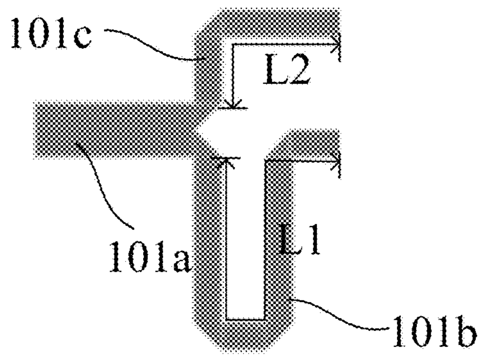
FIG. 17 is a schematic diagram illustrating a transmission component with a phase shift unit feeding to an antenna unit.

Specifically, FIG. 17 is a schematic diagram illustrating a transmission component 100 with a phase shift unit 20 feeding to an antenna unit 30; as shown in FIG. 17, the first feeding unit is a one-to-two power divider, in which the first branch 101*b* has a phase difference of 180° with respect to the second branch 101*c* by a mode of one-half wavelength winding, after a microwave signal fed in through the first branch 101*b* passes through the phase shift unit 20, the microwave signal is directly fed to the antenna unit 30 by the first transmission line 102, and after a microwave signal fed in through the second branch 101*c* passes through the phase shift unit 20, the microwave signal is fed to another adjacent antenna unit 30 through the second transmission line 103 by one-half wavelength winding, and in such case, before the first transmission line 102 and the second transmission line 103 feed the microwave signals to the antenna units corresponding thereto, the microwave signals transmitted by the first transmission line 102 and the second transmission line 103 are the same in amplitude and phase. In this case, a distance between every adjacent antenna units 30 may be equal to about one-half wavelength.

In some examples, the first feeding unit may employ a BALUN component. Several structures of the BALUN component are given below for illustration. Certainly, the antenna in the embodiment of the present disclosure includes not only the above structure, but also the third dielectric substrate 80 and the reference electrode layer 70.

Figure 18:
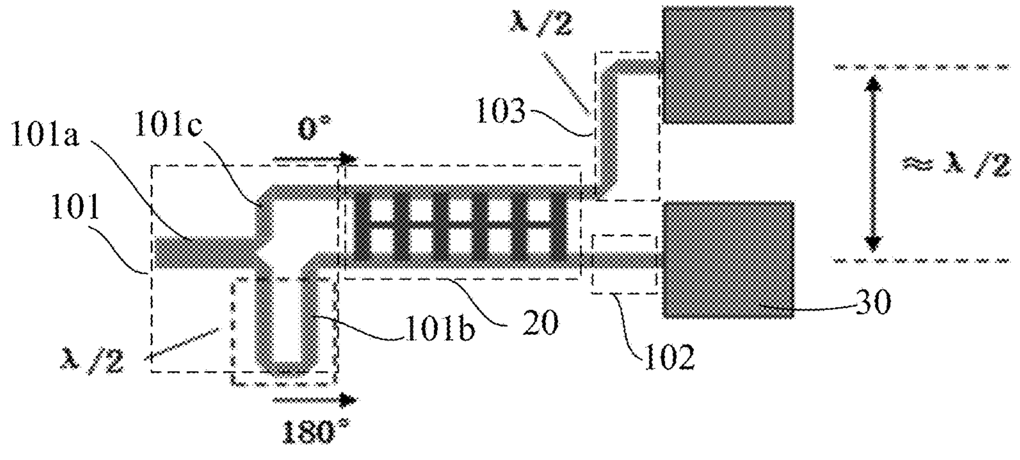
FIG. 18 is a schematic diagram of a BALUN component in a first example adopted in an antenna according to an embodiment of the present disclosure.

FIG. 18 is a schematic diagram of a BALUN component, in a first example, adopted in an antenna according to an embodiment of the present disclosure; as shown in FIG. 18, the third dielectric substrate 80 has a first surface and a second surface which are disposed opposite to each other, the reference electrode layer 70 is disposed on the first surface of the third dielectric substrate 80, the BALUN component is disposed on the second surface of the third dielectric substrate 80, and the first branch 101*b* and the second branch 101*c* of the BALUN component are both directly connected to the main path portion 101*a*, for example, the main path portion 101*a*, the first branch 101*b* and the second branch 101*c* of the BALUN component are formed into one piece. In this BALUN component, the first branch 101*b* includes a meandering line such that the first branch 101*b* has a phase difference of 180° with respect to the second branch 101*c*.

Figure 19:
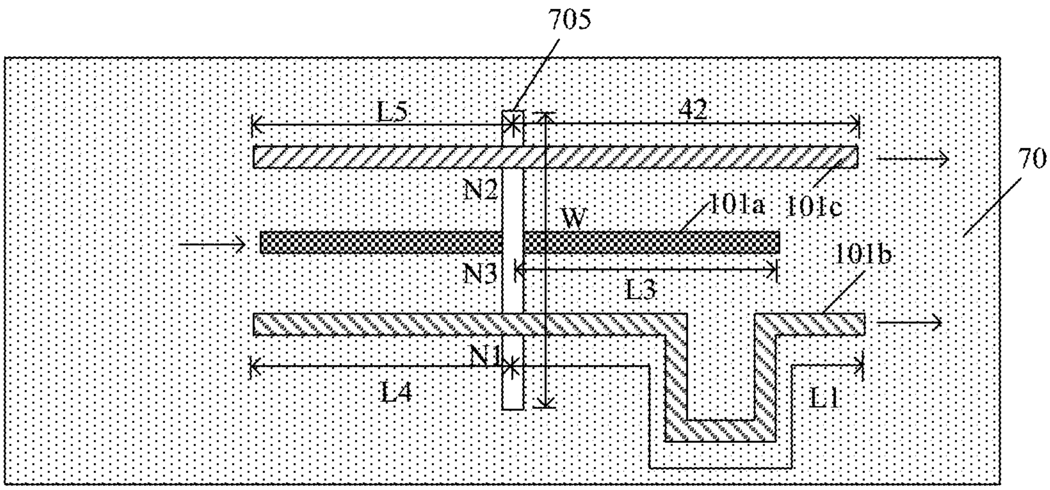
FIG. 19 is a schematic diagram of a BALUN component in a second example adopted in an antenna according to an embodiment of the present disclosure.

FIG. 19 is a schematic diagram of a BALUN component, in a second example, adopted in an antenna according to an embodiment of the present disclosure; as shown in FIG. 19, the third dielectric substrate 80 has a first surface and a second surface which are arranged opposite to each other, the reference electrode layer 70 has a fifth opening 705, an interlayer insulating layer is arranged on a side of the reference electrode layer 70 away from the third dielectric substrate 80, the main path portion 101*a* of the BALUN component is arranged on a side of the interlayer insulating layer away from the reference electrode layer 70, and an extending direction in which the main path portion 101*a* extends intersects with an extending direction in which the fifth opening 705 extends. The first branch 101*b* and the second branch 101*c* of the BALUN component are both disposed on the second surface of the third dielectric substrate 80, and extending directions in which main body portions of the first branch 101*b* and the second branch 101*c* extend intersect with the extending direction in which the fifth opening 705 extends. Orthographic projections of the main path portion 101*a*, the first branch 101*b* and the second branch 101*c* on the third dielectric substrate 80 all intersect with the orthographic projection of the fifth opening 705 of the reference electrode layer 70 on the third dielectric substrate 80, and the orthographic projections of the first branch 101*b* and the second branch 101*c* on the third dielectric substrate 80 define the orthographic projection of the main path portion 101*a* on the third dielectric substrate 80 therebetween. In this BALUN component, the first branch 101*b* includes a portion in a shape of a meandering line, and an intersection point of the first branch 101*b* and an orthographic projection of the fifth opening 705 on the third dielectric substrate 80 is a first intersection point N1, and an intersection point of the second branch 101*c* and the orthographic projection of the fifth opening 705 on the third dielectric substrate 80 is a second intersection N2; the first branch 101*b* and the second branch 101*c* each include a first end and a second end, a length from the first intersection point N1 of the first branch 101*b* to the second end of the first branch 101*b* is L1, a length from the second intersection point N2 of the second branch 101*c* to the second end of the second branch 101*c* is L2, and a difference between L1 and L2 is equal to one-half wavelength, so that the first branch 101*b* has a phase difference of 180° with respect to the second branch 101*c*.

Figure 20:
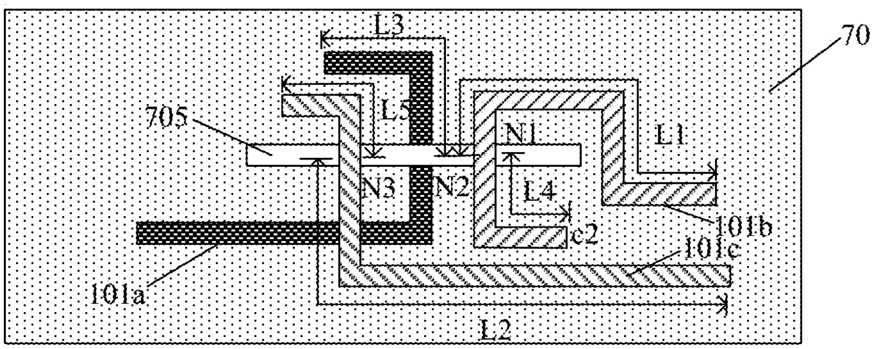
FIG. 20 is a schematic diagram of a BALUN component in a third example adopted in an antenna according to an embodiment of the present disclosure.

FIG. 20 is a schematic diagram of a BALUN component, in a third example, adopted in the antenna according to the embodiments of the present disclosure; as shown in FIG. 20, a structure of this BALUN component is substantially the same as that of the BALUN component in the second example, except that the main path portion 101*a*, the first branch 101*b*, and the second branch 101*c* in the BALUN component each include a portion in a shape of a meandering line. The main path portion 101*a*, the first branch 101*b* and the second branch 101*c* each include a first end and a second end. Orthographic projections of the first branch 101*b*, the second branch 101*c* and the main path portion 101*a* on the third dielectric substrate 80 intersect with the orthographic projection of the fifth opening 705 on the third dielectric substrate 80 at a first intersection point N1, a second intersection point N2 and a third intersection point N3, respectively. Orthographic projections of the first end of the first branch 101*b* and the first end of the second branch 101*c* on the third dielectric substrate 80 are located on different sides of the orthographic projection of the fifth opening 705 on the third dielectric substrate 80. Orthographic projections of the first end of the main path portion 101*a* and the first end of the second branch 101*c* on the third dielectric substrate 80 are on a same side of the orthographic projection of the fifth opening 705 on the third dielectric substrate 80. A length from the second end of the main branch 101*a* to the third intersection point N3 is L3, a length from the first end of the first branch 101*b* to the first intersection point N1 is L4, a length from the first end of the second branch 101*c* to the second intersection point N2 is L5, and L3, L4 and L5 are all approximately equal to quarter wavelength. A length from the first intersection point N1 of the first branch 101*b* to the second end of the first branch 101*b* is L1, a length from the second intersection point N2 of the second branch 101*c* to the second end of the second branch 101*c* is L2, and L1 and L2 are approximately the same.

Figure 21:
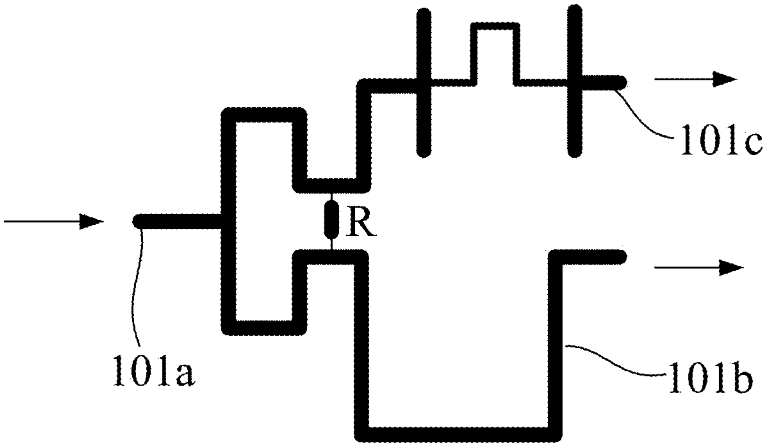
FIGS. 21 and 22 are schematic diagrams of a BALUN component in a fourth example adopted in an antenna according to an embodiment of the present disclosure.
Figure 22:
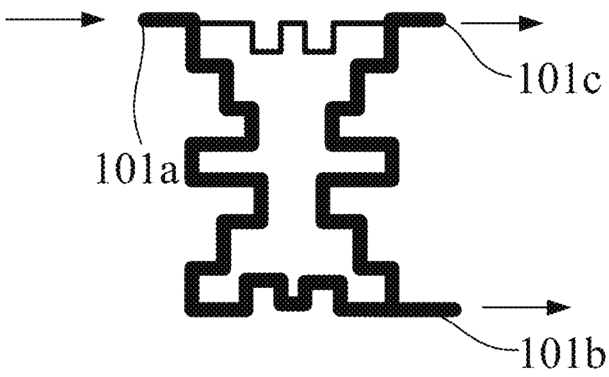

FIGS. 21 and 22 are schematic diagrams of a BALUN component, in a fourth example, adopted in the antenna according to the embodiments of the present disclosure; as shown in FIG. 21, a structure of this BALUN component is substantially the same as that of the BALUN component in the first example, except that each of the first branch 101*b* and the second branch 101*c* of the BALUN component is in a shape of a meandering line, bending manner and widths of the first branch 101*b* and the second branch 101*c* are adjusted so that the first branch 101*b* and the second branch 101*c* have a phase difference of 180° therebetween. Similarly, as shown in FIG. 22, the first branch 101*b* and the second branch 101*c* are connected to form a closed loop meandering line having two ports, and the widths of the first branch 101*b* and the second branch 101*c* are adjusted so that the first branch 101*b* and the second branch 101*c* have a phase difference of 180° therebetween.

It should be noted that, only a few examples of the BALUN component are given above, but it should be understood that not only the BALUN component including the above exemplary structures, but also any three-port BALUN component may be applied in the antenna of the embodiment of the present disclosure, and thus the above exemplary BALUN components do not limit the protective scope of the present disclosure.

In some examples, the antenna unit 30 in the embodiment of the present disclosure may adopt a radiation antenna, which may be a radiation patch in any shape such as a circle, a rectangle, a diamond, and the like. Certainly, the antenna unit 30 in the embodiment of the present disclosure may also be another type of antenna unit 30, such as a dipole, a slot antenna, and the like. In addition, a position where the antenna unit 30 is positioned is as described above, and the description thereof is not repeated herein.

In some examples, the first dielectric substrate 40 and the second dielectric substrate 50 in the embodiment of the present disclosure may be glass substrates, plastics, or the like. The third dielectric substrate 80 in the embodiment of the present disclosure may be a Printed Circuit Board (PCB) or the like.

In some examples, the antenna in the embodiment of the present disclosure includes a plurality of stages of transmission structures, for example, includes three or even more stages of transmission structures. In an example, each transmission component in the antenna includes the phase shift unit. In an example, each transmission component in at least one stage of transmission components includes the phase shift unit, a portion of the transmission components in at least one stage of transmission components each include the phase shift unit, and none of the transmission components in at least one of the stages of transmission components is provided with the phase shift unit. In an example, each transmission component in a portion of the stages of transmission components includes the phase shift unit, and all transmission components in another portion of the stages of transmission components are provided with no phase shift unit. It should be noted that, the above only provides several examples, and which transmission components being desired to be provided with the phase shift unit may be specifically determined according to a phase shift amount of the antenna, and the specific position of the phase shift unit is not specifically defined in the embodiment of the present disclosure.

In order to make the architecture of the antenna in the embodiment of the present disclosure clearer, several exemplary architectures of the antenna are given below. A case where the feeding network 10 of the antenna including three stages of transmission components 100 is taken as an example for illustration. The phase shift unit 20 in the antenna may adopt any one phase shift unit 20 described above, and only the phase shift unit 20 shown in FIG. 5 is taken as an example in the drawings. The first feeding unit in the transmission component 100 with the phase shift unit 20 adopts the BALUN component shown in FIG. 18, and accordingly, the first transmission line 102 in the transmission component 100 has a phase difference of 180° with respect to the second transmission line 103.

In a first implementation, as shown in FIG. 3, each transmission component 100 of the feeding network 10 of the antenna includes a first feeding unit, a phase shift unit 20, a first transmission line 102 and a second transmission line 103. A transmission structure in a first stage includes one transmission component 100, a transmission structure in a second stage includes two transmission components 100, and a transmission structure in a third stage includes four transmission components 100. The first branch 101*b* of the first feeding unit of each transmission component 100 is connected to the first end of the first main line 21 of the phase shift unit 20, the second end of the first main line 21 is connected to the first transmission line 102, the second branch 101*c* of the first feeding unit is connected to the first end of the second main line 22 of the phase shift unit 20, and the second end of the second main line 22 is connected to the second transmission line 103. The first transmission line 102 and the second transmission line 103 in the transmission component 100 in the first stage are respectively connected to the main path portions 101*a* of the first feeding units of the two transmission components 100 in the second stage, the first transmission lines 102 and the second transmission lines 103 (two first transmission lines 102 and two second transmission lines 103) of the two transmission components 100 in the second stage are respectively connected to the main path portions 101*a* of the first feeding units of the four transmission components 100 in the third stage, and the first transmission lines 102 and the second transmission lines 103 (four first transmission lines 102 and four second transmission lines 103) of the four transmission components 100 in the third stage are respectively connected to eight antenna units 30.

Figure 23:
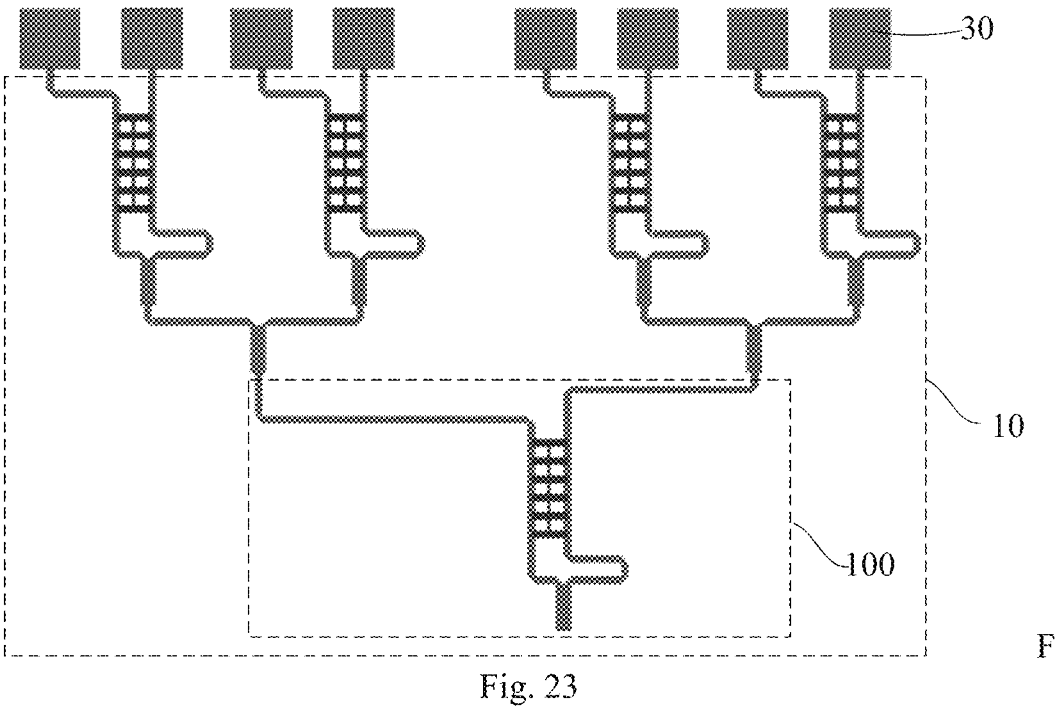
FIG. 23 is a schematic diagram of an architecture of an antenna in a second implementation of an embodiment of the present disclosure.

FIG. 23 is an architecture diagram of an antenna in a second implementation of an embodiment of the present disclosure; as shown in FIG. 23, in the second implementation, a structure of the antenna is similar to that of the antenna in the first implementation, except that the transmission components 100 in the second stage include no phase shift unit 20, the first branch 101*b* of the first feeding unit and the first transmission line 102 are formed into one piece, the second branch 101*c* of the first feeding unit and the second transmission line 103 are formed into one piece, and none of the first branch 101*b*, the first transmission line 102, the second branch 101*c* and the second transmission line 103 includes a delay line, and all of the first branch 101*b*, the first transmission line 102, the second branch 101*c* and the second transmission line 103 are in a shape of a straight line segment. The rest structure of the antenna is the same as that in the first implementation, and thus, the description thereof is not repeated herein.

Figure 24:
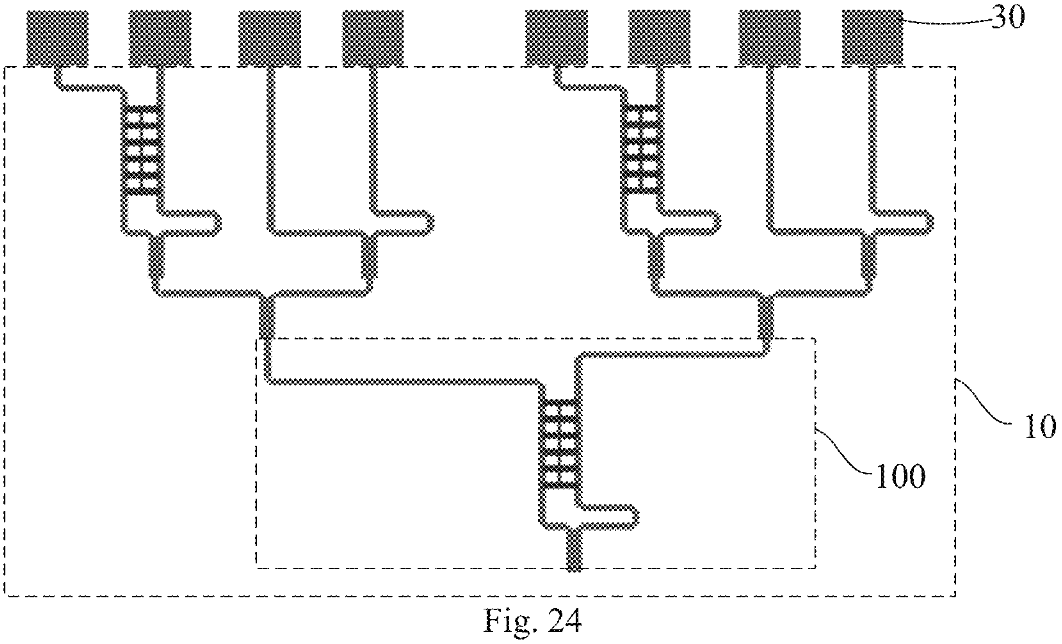
FIG. 24 is a schematic diagram of an architecture of an antenna in a third implementation of an embodiment of the present disclosure.

FIG. 24 is an architecture diagram of an antenna in a third implementation of an embodiment of the present disclosure; as shown in FIG. 24, in the third implementation, a structure of the antenna is similar to that of the antenna in the second implementation, except that none of a second transmission component 100 and a fourth transmission component 100 in the third stage from left to right includes the phase shift unit 20, and the first transmission line 102 and the second transmission line 103 are the same in length, that is, there is no phase difference of 180° between the first transmission line 102 and the second transmission line 103. The rest structure of the antenna is the same as that of the antenna in the second implementation, and thus, the description thereof is not repeated herein.

Figure 25:
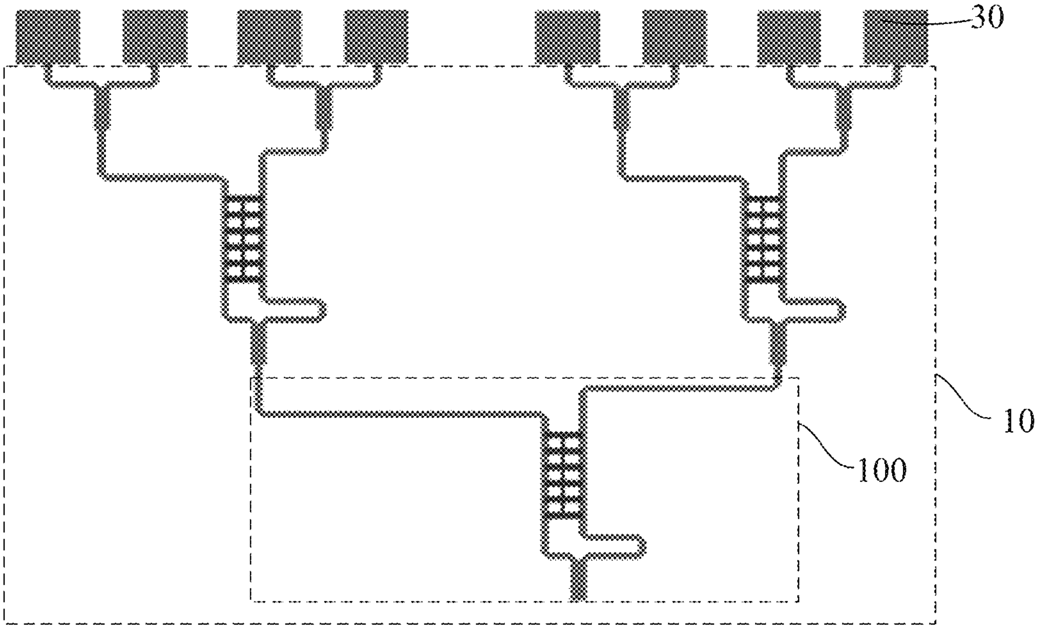
FIG. 25 is a schematic diagram of an architecture of an antenna in a fourth implementation of an embodiment of the present disclosure.

FIG. 25 is an architecture diagram of an antenna in a fourth implementation of an embodiment of the present disclosure; as shown in FIG. 25, in the fourth implementation, the structure of the antenna is similar to that of the antenna in the first implementation, except that none of the transmission components 100 in the third stage includes the phase shift unit 20, the first branch 101*b* of the first feeding unit and the first transmission line 102 are formed into one piece, the second branch 101*c* of the first feeding unit and the second transmission line 103 are formed into one piece, and none of the first branch 101*b*, the first transmission line 102, the second branch 101*c* and the second transmission line 103 includes a delay line, and all of the first branch 101*b*, the first transmission line 102, the second branch 101*c* and the second transmission line 103 are in a shape of a straight line segment. The the rest structure of the antenna is the same as that of the antenna in the first implementation, and thus, the description thereof is not repeated herein.

It should be noted that, only four exemplary architectures of the antenna are given above, and the specific architecture of each stage of transmission components 100 may be designed according to the phase shift amount in an actual product, and is not listed here.

In a second aspect, an embodiment of the present disclosure provides an antenna system, which may include the above-mentioned antenna. The antenna system provided by the embodiment of the present disclosure further includes a transceiving unit, a radio frequency transceiver, a signal amplifier, a power amplifier and a filtering unit. The antenna in the antenna system may serve as a transmitting antenna or a receiving antenna. The transceiver unit may include a baseband and a receiving terminal, where the baseband provides signals of at least one frequency band, for example, provides 2G signals, 3G signals, 4G signals, 5G signals, and transmits the signals of at least one frequency band to the radio frequency transceiver. After receiving any signal, the antenna in the antenna system may transmit the signal to the receiving terminal in the transceiving unit after the signal is processed by the filtering unit, the power amplifier, the signal amplifier, and the radio frequency transceiver, the receiving terminal may be, for example, an intelligent gateway.

Furthermore, the radio frequency transceiver is connected to the transceiver unit, and is configured to modulate a signal transmitted by the transceiver unit, or demodulate a signal received by the antenna and transmit the modulated signal to the transceiver unit. Specifically, the radio frequency transceiver may include a transmitting circuit, a receiving circuit, a modulating circuit, and a demodulating circuit, and after the transmitting circuit receives multiple types of signals provided by the baseband, the modulating circuit may modulate the multiple types of signals provided by the baseband, and then transmit the modulated signals to the antenna. The antenna receives the signals and transmits the signals to the receiving circuit of the radio frequency transceiver, the receiving circuit transmits the signals to the demodulating circuit, and the demodulating circuit demodulates the signals and transmits the demodulated signals to the receiving terminal.

Furthermore, the radio frequency transceiver is connected to the signal amplifier and the power amplifier, the signal amplifier and the power amplifier are further connected to the filtering unit, and the filtering unit is connected with at least one antenna. In the process of transmitting a signal by the antenna system, the signal amplifier is configured to improve the signal-to-noise ratio of the signal output by the radio frequency transceiver and then transmit the signal to the filtering unit; the power amplifier is configured to amplify power of the signal output by the radio frequency transceiver and then transmit the signal to the filtering unit; the filtering unit may include a duplexer and a filtering circuit, and combines signals output by the signal amplifier and the power amplifier, filters clutter out and then transmits the combined signal to the antenna, and the antenna radiates the signal out. In the process of receiving a signal by the antenna system, after receiving the signal, the antenna transmits the signal to the filtering unit, the filtering unit filters the signal received by the antenna to remove clutter and then transmits the signal to the signal amplifier and the power amplifier, and the signal amplifier gains the signal received by the antenna to increase the signal-to-noise ratio of the signal; the power amplifier amplifies the power of the signal received by the antenna. The signal received by the antenna is processed by the power amplifier and the signal amplifier and then transmitted to the radio frequency transceiver, and then the radio frequency transceiver transmits the signal to the transceiver unit.

In some examples, the signal amplifier may include various types of signal amplifiers, such as a low noise amplifier, which is not limited herein.

In some examples, the antenna system provided in the present disclosure further includes a power management unit, which is connected to the power amplifier, for providing the power amplifier with a voltage for amplifying the signal.

It will be understood that the above implementations are merely exemplary implementations employed to illustrate the principles of the present disclosure, but the present disclosure is not limited thereto. It will be apparent to those skilled in the art that various changes and modifications may be made without departing from the spirit and scope of the present disclosure, and these changes and modifications are to be considered within the scope of the present disclosure.

What is claimed is:

1. An antenna, comprising: a feeding network and a plurality of antenna units electrically connected with the feeding network; the feeding network comprises n stages of transmission components, and each stage comprises $2^{n-1}$ transmission components, where n≥1 and n is an integer; each transmission component comprises a first feeding unit, a first transmission line and a second transmission line; the first feeding unit comprises a main path portion, a first branch and a second branch, and both the first branch and the second branch are electrically connected with the main path portion; the first branch in the transmission component is electrically connected with the first transmission line, and the second branch in the transmission component is electrically connected with the second transmission line;

for the n=1 stage, the first transmission line and the second transmission line of each transmission component are respectively electrically connected with two different antenna units, and the antenna unit connected with the first transmission line is different from the antenna unit connected with the second transmission line;

for the n>1 stage, the first transmission line and the second transmission line of each transmission component in the $n^{th}$ stage are respectively electrically connected with two different antenna units, and the antenna units connected with first transmission lines and second transmission lines are different; the first transmission line and the second transmission line of each transmission component in an $i^{th}$ stage are electrically connected with two different main path portions in an $(i+1)^{th}$ stage respectively, and the main path portions connected with the first transmission lines and the second transmission lines are different, wherein 1≤i<n, and i is an integer, and wherein, at least part of the transmission components each further comprise a phase shift unit, in each transmission component comprising the phase shift unit, two ends of a first main line of the phase shift unit are respectively electrically connected with the first branch of the first feeding unit and the first transmission line, and two ends of a second main line of the phase shift unit are respectively electrically connected with the second branch of the first feeding unit and the second transmission line.

2. The antenna of claim 1, wherein the phase shift unit further comprises a first dielectric substrate and a second dielectric substrate disposed opposite to each other, a plurality of patch electrodes spaced apart from each other, and an adjustable dielectric layer;

the adjustable dielectric layer in the phase shift unit is located between the first dielectric substrate and the second dielectric substrate; the first main line and the second main line are located on a side, close to the adjustable dielectric layer, of the first dielectric substrate; the patch electrodes are located on a side, close to the adjustable dielectric layer, of the second dielectric substrate;

in the phase shift unit, the patch electrodes are arranged side by side in an extending direction in which the first main line extends, and the first main line and the second main line both at least overlap orthographic projections of the patch electrodes on the first dielectric substrate.

3. The antenna of claim 2, further comprising a third dielectric substrate and a reference electrode layer, the third dielectric substrate is located on a side, away from the first dielectric substrate, of the reference electrode layer, the first feeding unit, the first transmission line and the second transmission line of the transmission component are located on a side, away from the reference electrode layer, of the third dielectric substrate.

4. The antenna of claim 3, wherein the reference electrode layer is provided with a first opening, a second opening, a third opening, and a fourth opening, in the transmission component comprising the phase shift unit, a first end of the first main line is coupled with the first branch of the first feeding unit through the first opening, a second end of the first main line is coupled with the first transmission line through the second opening, a first end of the second main line is coupled with the second branch of the first feeding unit through the third opening, and a second end of the second main line is coupled with the second transmission line through the fourth opening.

5. The antenna of claim 3, wherein the antenna units are located on a side of the third dielectric substrate away from the dielectric layer.

6. The antenna of claim 3, wherein at least a part of first feeding units each comprise a BALUN component.

7. The antenna of claim 6, wherein the main path portion, the first branch and the second branch of each of the at least a part of first feeding units are formed into one piece, and one of the first branch and the second branch is in a shape of a straight line and the other of the first branch and the second branch is in a shape of a meandering line.

8. The antenna of claim 6, further comprising an interlayer insulating layer located on a side of the reference electrode layer away from the third dielectric substrate, the main path portion of each of the at least a part of first feeding units is located on a side of the interlayer insulating layer away from the third dielectric substrate, the first branch and the second branch of the BALUN component are located on a side of the third dielectric substrate away from the interlayer insulating layer, and an orthographic projection of the main path portion on the third dielectric substrate is located between orthographic projections of the first branch and the second branch on the third dielectric substrate; the reference electrode layer is provided with a fifth opening, an extending direction in which the fifth opening extends is intersected with an extending direction in which the main path portion extends, and orthographic projections of the main path portion, the first branch and the third branch on the third dielectric substrate each pass through an orthographic projection of the fifth opening on the third dielectric substrate, and one of the first branch and the second branch is in a shape of a straight line, and the other of the first branch and the second branch is in a shape of a meandering line.

9. The antenna of claim 6, further comprising an interlayer insulating layer located on a side of the reference electrode layer away from the third dielectric substrate, the main path portion of each of the at least a part of first feeding units is located on a side of the interlayer insulating layer away from the third dielectric substrate, the first branch and the second branch of each of the at least a part of first feeding units are located on a side of the third dielectric substrate away from the interlayer insulating layer, and an orthographic projection of a partial structure of the main path portion on the third dielectric substrate is located between an orthographic projection of a partial structure of the first branch on the third dielectric substrate and an orthographic projection of a partial structure of the second branch on the third dielectric substrate, the main path portion, the first branch and the third branch each comprises a portion whose orthographic projection on the third dielectric substrate passes through an orthographic projection of the fifth opening on the third dielectric substrate, and the main path portion, the first branch and the second branch are all in a shape of a meandering line.

10. The antenna of claim 6, wherein the main path portion, the first branch and the second branch of each of the at least a part of first feeding units are formed into one piece, and the main path portion, the first branch and the second branch are all in a shape of a meandering line, and widths of the first branch and the second branch are different.

11. The antenna of claim 2, further comprising a reference electrode layer located on a side of the second dielectric substrate away from the adjustable dielectric layer, and the first feeding unit, the first transmission line and the second transmission line are all located on a side, close to the adjustable dielectric layer, of the first dielectric substrate, wherein the antenna units are located on a side of the first dielectric substrate close to the adjustable dielectric layer, and the antenna units are located on a side of the first dielectric substrate away from the adjustable dielectric layer.

12. The antenna of claim 1, wherein the phase shift unit further comprises a first dielectric substrate and a second dielectric substrate disposed opposite to each other, first branch portions, second branch portions, and an adjustable dielectric layer;

the adjustable dielectric layer in the phase shift unit is located between the first dielectric substrate and the second dielectric substrate; the first main line and the first branch portions are located on a side of the first dielectric substrate close to the adjustable dielectric layer, and the second main line and the second branch portions are located on a side of the second dielectric substrate close to the adjustable dielectric layer; the first branch portions are connected to a side of the first main line in an extending direction in which the first main line extends, and the second branch portions are connected to a side of the second main line in an extending direction in which the second main line extends;

in the phase shift unit, orthographic projections of one of the first branch portions and one of the second branch portions on the first dielectric substrate at least partially overlap to define an overlapping region, and the overlapping region is located between orthographic projections of the first main line and the second main line on the first dielectric substrate.

13. The antenna of claim 12, further comprising a reference electrode layer located on a side of the second dielectric substrate away from the adjustable dielectric layer, and the first feeding unit, the first transmission line and the second transmission line are all located on a side, close to the adjustable dielectric layer, of the first dielectric substrate, wherein the antenna units are located on a side of the first dielectric substrate close to the adjustable dielectric layer, and the antenna units are located on a side of the first dielectric substrate away from the adjustable dielectric layer.

14. The antenna of claim 1, wherein the phase shift unit further comprises a first dielectric substrate and a second dielectric substrate disposed opposite to each other, a first reference sub-electrode, a second reference sub-electrode, a third reference sub-electrode, a plurality of patch electrodes spaced apart from each other, and an adjustable dielectric layer;

the adjustable dielectric layer in the phase shift unit is located between the first dielectric substrate and the second dielectric substrate; the first reference sub-electrode, the second reference sub-electrode, the third reference sub-electrode, the first main line and the second main line are located on a side of the first dielectric substrate close to the adjustable dielectric layer; the first main line is located between the first reference sub-electrode and the second reference sub-electrode, and the second main line is located between the second reference sub-electrode and the third reference sub-electrode; the patch electrodes are located on a side, close to the adjustable dielectric layer, of the second dielectric substrate;

in the phase shift unit, the patch electrodes are arranged side by side in an extending direction in which the first main line extends, and the first reference sub-electrode, the second reference sub-electrode, the third reference sub-electrode, the first main line and the second main line at least overlap orthographic projections of the patch electrodes on the first dielectric substrate.

15. The antenna of claim 14, further comprising a reference electrode layer located on a side of the first dielectric substrate away from the adjustable dielectric layer; the first reference sub-electrode, the second reference sub-electrode and the third reference sub-electrode are all electrically connected with the reference electrode layer through via holes penetrating through the first dielectric substrate.

16. The antenna of claim 1, wherein lengths of the first branch and the second branch in at least the transmission component comprising the phase shift unit are different, lengths of the first transmission line and the second transmission line are different, and a difference between the lengths of the first branch and the second branch is equal to a difference between the lengths of the second transmission line and the first transmission line.

17. The antenna of claim 1, wherein an interval between any two antenna units connecting with a same transmission component is equal to one-half wavelength.

18. The antenna of claim 1, comprising multiple stages of transmission components, wherein each transmission component in at least one stage comprises the phase shift unit, or a part of the transmission components in at least one stage each comprise the phase shift unit, or each transmission component in at least one stage comprises no phase shift unit.

19. The antenna of claim 1, comprising multiple stages of transmission components, wherein each transmission component in a part of the stages comprises the phase shift unit, and each transmission component in another part of the stages comprises no phase shift unit.

20. An antenna system, comprising the antenna of claim 1.

* * * * *